United States Patent
Mohanty et al.

(10) Patent No.: US 11,150,394 B2
(45) Date of Patent: Oct. 19, 2021

(54) DUTY CYCLE RANGE INCREASE FOR WAVEGUIDE COMBINERS

(71) Applicant: Facebook Technologies, LLC, Menlo Park, CA (US)

(72) Inventors: Nihar Ranjan Mohanty, Snoqualmie, WA (US); Matthew E. Colburn, Woodinville, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/264,245

(22) Filed: Jan. 31, 2019

(65) Prior Publication Data

US 2020/0249386 A1    Aug. 6, 2020

(51) Int. Cl.
| | |
|---|---|
| *G02B 6/00* | (2006.01) |
| *F21V 8/00* | (2006.01) |
| *G02B 27/01* | (2006.01) |

(52) U.S. Cl.
CPC ......... *G02B 6/0016* (2013.01); *G02B 6/0038* (2013.01); *G02B 6/0065* (2013.01); *G02B 27/0172* (2013.01); *G02B 2027/0178* (2013.01)

(58) Field of Classification Search
CPC ... G02B 6/0016; G02B 6/0065; G02B 6/0038
See application file for complete search history.

(56) References Cited

U.S. PATENT DOCUMENTS

| | | | |
|---|---|---|---|
| 4,506,949 A | 3/1985 | Knop | |
| 5,572,564 A * | 11/1996 | Murakami | B82Y 10/00 378/34 |
| 7,054,065 B2 * | 5/2006 | Wolfe | G02B 5/0808 359/569 |
| 8,335,414 B2 * | 12/2012 | Zinoviev | G01N 21/8422 385/37 |
| 9,304,235 B2 * | 4/2016 | Sainiemi | B05D 5/06 |
| 9,329,325 B2 * | 5/2016 | Simmonds | G02B 6/0038 |

(Continued)

FOREIGN PATENT DOCUMENTS

| | | | |
|---|---|---|---|
| EP | 1183684 B1 | 6/2008 | |
| JP | 01231327 A * | 9/1989 | ............. G03F 7/094 |

(Continued)

OTHER PUBLICATIONS

Shubin Li, Changhe Zhou, Hongchao Cao, and Jun Wu, "Simple design of slanted grating with simplified modal method," Opt. Lett. 39, 781-784 (2014) (Year: 2014).*

(Continued)

*Primary Examiner* — Peter Radkowski
(74) *Attorney, Agent, or Firm* — Weaver Austin Villeneuve & Sampson LLP

(57) ABSTRACT

Techniques for fabricating a slanted structure are disclosed. In one embodiment, a method of fabricating a slanted surface-relief structure in a material layer includes forming a thin hard mask on top of an intermediate mask layer, etching the intermediate mask layer at a slant angle using the thin hard mask to form a slanted intermediate mask, and etching the material layer at the slant angle using the slanted intermediate mask to form the slanted surface-relief structure in the material layer. The intermediate mask layer is characterized by an etch rate greater than an etch rate of the material layer.

10 Claims, 18 Drawing Sheets

(56) References Cited

U.S. PATENT DOCUMENTS

| | | | |
|---|---|---|---|
| 9,519,089 B1* | 12/2016 | Brown | G02B 27/0172 |
| 9,684,108 B2* | 6/2017 | Kuittinen | G02B 6/34 |
| 10,025,018 B2* | 7/2018 | Kuittinen | G02B 6/0016 |
| 2004/0037503 A1* | 2/2004 | Hastings | G02B 6/124 |
| | | | 385/37 |
| 2004/0190141 A1* | 9/2004 | Wolfe | G02B 5/0808 |
| | | | 359/572 |
| 2005/0211547 A1 | 9/2005 | Hanawa et al. | |
| 2005/0277063 A1* | 12/2005 | Wang | G02B 5/3025 |
| | | | 430/311 |
| 2006/0001972 A1* | 1/2006 | Sato | G01J 3/18 |
| | | | 359/569 |
| 2006/0045987 A1 | 3/2006 | Chandler et al. | |
| 2007/0263973 A1* | 11/2007 | Van Laere | G02B 6/124 |
| | | | 385/129 |
| 2008/0003528 A1 | 1/2008 | Gaylord et al. | |
| 2010/0142892 A1* | 6/2010 | Kuittinen | G02B 6/34 |
| | | | 385/37 |
| 2010/0277803 A1* | 11/2010 | Pockett | G02B 27/0172 |
| | | | 359/567 |
| 2011/0102777 A1* | 5/2011 | Zinoviev | G01N 21/41 |
| | | | 356/128 |
| 2012/0044572 A1* | 2/2012 | Simmonds | G02B 6/0038 |
| | | | 359/630 |
| 2013/0192758 A1 | 8/2013 | Toth et al. | |
| 2014/0175045 A1 | 6/2014 | Zhu et al. | |
| 2015/0125976 A1 | 5/2015 | Wang | |
| 2015/0279686 A1 | 10/2015 | Kuo et al. | |
| 2016/0033697 A1* | 2/2016 | Sainiemi | C03C 15/00 |
| | | | 359/575 |
| 2016/0033784 A1* | 2/2016 | Levola | G02B 5/1842 |
| | | | 385/37 |
| 2016/0035539 A1* | 2/2016 | Sainiemi | B81C 1/00547 |
| | | | 204/298.36 |
| 2016/0042971 A1 | 2/2016 | Mohanty | |
| 2016/0231569 A1* | 8/2016 | Levola | G02B 27/0172 |
| 2017/0003504 A1* | 1/2017 | Vallius | G02B 27/0172 |
| 2017/0059879 A1 | 3/2017 | Vallius | |
| 2017/0285240 A1* | 10/2017 | Kuittinen | G02B 6/34 |
| 2017/0311430 A1 | 10/2017 | Liang et al. | |
| 2018/0081176 A1* | 3/2018 | Olkkonen | G02B 5/1823 |
| 2019/0227316 A1* | 7/2019 | Lee | G02B 27/0081 |

FOREIGN PATENT DOCUMENTS

| | | | | |
|---|---|---|---|---|
| TW | 202030890 A | 8/2020 | | |
| WO | 2016018739 | 2/2016 | | |
| WO | WO-2016018739 A1 * | 2/2016 | | G02B 27/4205 |
| WO | 2020159535 | 8/2020 | | |

OTHER PUBLICATIONS

J. Michael Miller, Nicole de Beaucoudrey, Pierre Chavel, Jari Turunen, and Edmond Cambril, "Design and fabrication of binary slanted surface-relief gratings for a planar optical interconnection," Appl. Opt. 36, 5717-5727 (1997) (Year: 1997).*

Tapani Levola and Pasi Laakkonen, "Replicated slanted gratings with a high refractive index material for in and outcoupling of light," Opt. Express 15, 2067-2074 (2007) (Year: 2007).*

Lifeng Li and Lijiang Zeng, "Measurement of duty cycles of photoresist grating masks made on top of multilayer dielectric stacks," Appl. Opt. 44, 4494-4500 (2005) (Year: 2005).*

Wang, Bin Compact Waveguide Grating Couplers Operating in the Strong Coupling Regime, Dissertation, 2005 (Year: 2005).*

John R. Marciante, Nestor O. Farmiga, Jeffrey I. Hirsh, Michelle S. Evans, and Hieu T. Ta, "Optical measurement of depth and duty cycle for binary diffraction gratings with subwavelength features," Appl. Opt. 42, 3234-3240 (2003) (Year: 2003).*

Wang et al., Compact slanted grating couplers, Optics Express, Jul. 26, 2004 / vol. 12, No. 15 (Year: 2004).*

Levola et al., "Replicated slanted gratings with a high refractive index material for in and outcoupling of light," Opt. Express 15, 2067-2074 (2007) (Year: 2007).*

Bai et al., "Optimization of nonbinary slanted surface-relief gratings as high-efficiency broadband couplers for light guides," Appl. Opt. 49, 5454-5464 (2010) (Year: 2010).*

International Application No. PCT/US2018/058272, "International Search Report and Written Opinion," dated Mar. 11, 2019, 14 pages.

Miller, et al., "Design and Fabrication of Binary Slanted Surface-Relief Gratings for a Planar Optical Interconnection", Applied Optics, vol. 36, No. 23, Aug. 10, 1997, 11 pages.

International Application No. PCT/US2018/036515, "International Search Report and Written Opinion", dated Sep. 27, 2018, 15 pages.

International Application No. PCT/US2019/016283, "International Search Report and Written Opinion", dated Oct. 30, 2019, 11 pages.

* cited by examiner

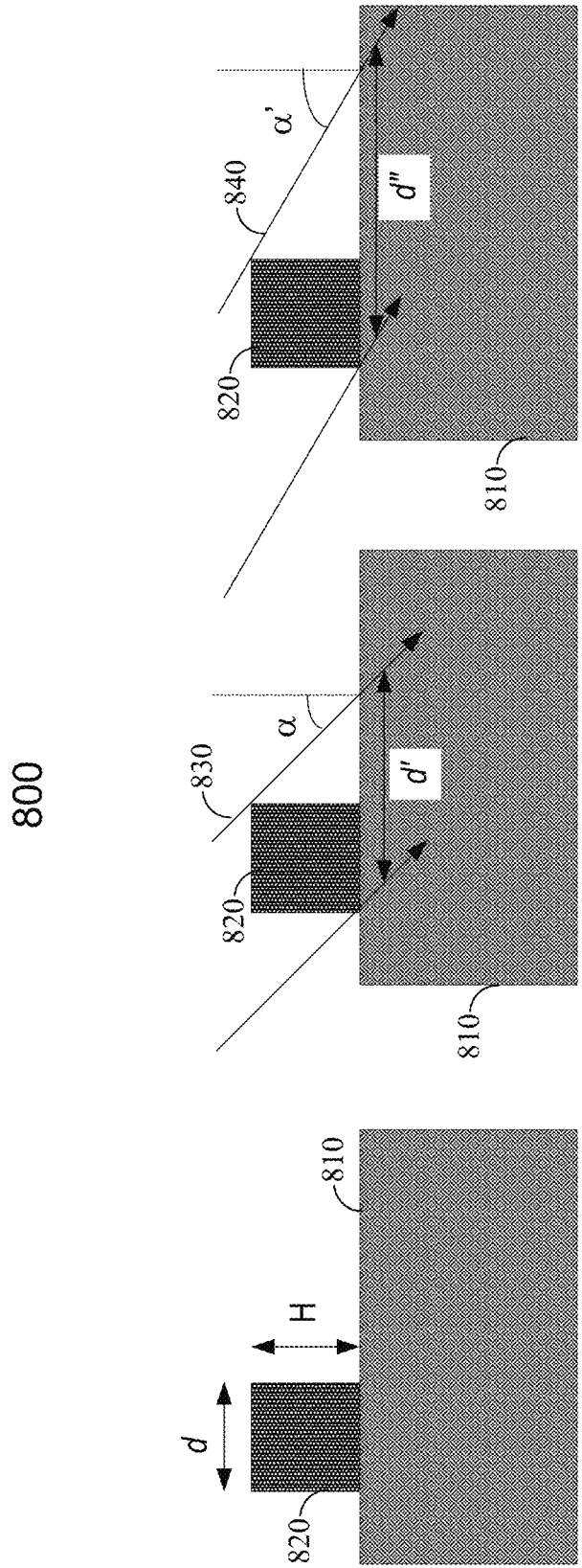

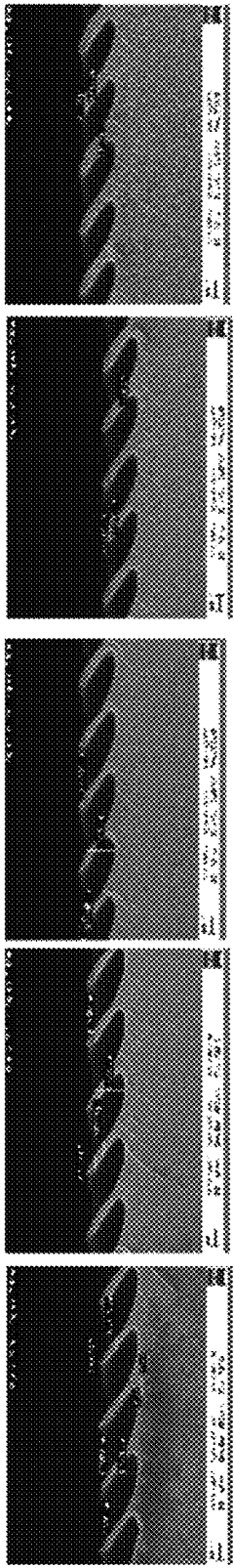
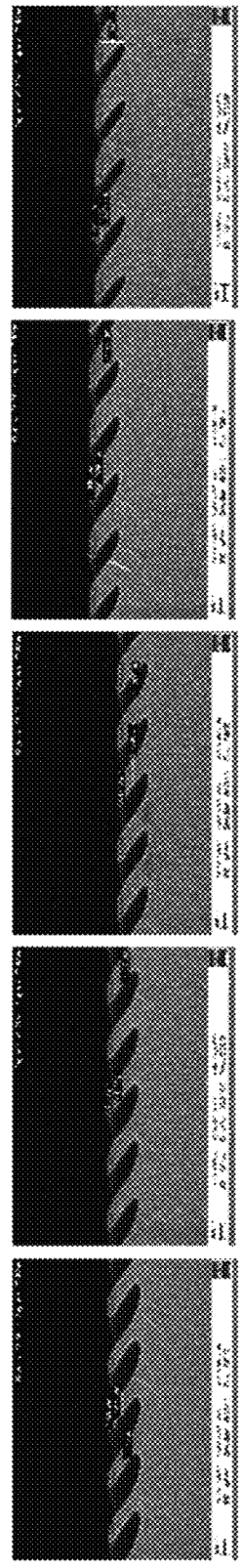
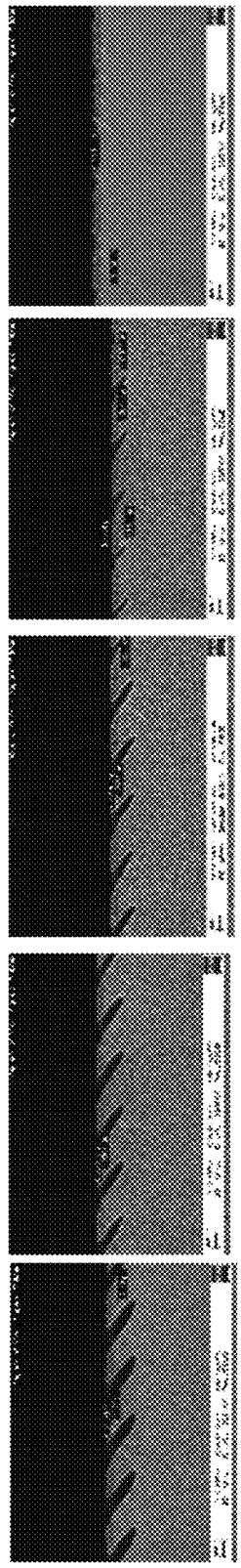

1600

1605

DUTY CYCLE RANGE INCREASE FOR WAVEGUIDE COMBINERS

BACKGROUND

An artificial reality system, such as a head-mounted display (HMD) or heads-up display (HUD) system, generally includes a display configured to present artificial images that depict objects in a virtual environment. The display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example optical see-through AR system may use a waveguide-based optical display, where light of projected images may be coupled into a waveguide (e.g., a substrate), propagate within the waveguide, and be coupled out of the waveguide at different locations. In some implementations, the light of the projected images may be coupled into or out of the waveguide using a diffractive optical element, such as a slanted surface-relief grating. To achieve desire performance, such as high efficiency, low artifact, and angular selectivity, deep surface-relief gratings with large slanted angles and wide ranges of grating duty cycles may be used. However, fabricating the slanted surface-relief grating with the desired profile at a high fabrication speed and high yield remains a challenging task.

SUMMARY

This disclosure relates generally to techniques for fabricating slanted structures. More specifically, and without limitation, disclosed herein are techniques for etching deep slant structures having a wide range of duty cycles on various inorganic or organic materials, such as silicon dioxide, silicon nitride, titanium dioxide, alumina, polymer, and the like. Various inventive embodiments are described herein, including methods, systems, devices, and the like.

In some embodiments, a method of fabricating a slanted surface-relief structure in a material layer may include forming a thin hard mask on top of an intermediate mask layer, etching the intermediate mask layer at a slant angle using the thin hard mask to form a slanted intermediate mask, and etching the material layer at the slant angle using the slanted intermediate mask to form the slanted surface-relief structure in the material layer. The intermediate mask layer is characterized by an etch rate greater than an etch rate of the material layer.

In some embodiments, a duty cycle of the slanted surface-relief structure may be less than 30%. In some embodiments, the slanted surface-relief structure may include a slanted surface-relief optical grating characterized by a duty cycle varying across areas of the slanted surface-relief optical grating, and a minimum of the duty cycle of the slanted surface-relief optical grating may be less than about 30%. In some embodiments, the slant angle may be greater than 30° with respect to a surface normal of the material layer. In some embodiments, a depth of the slanted surface-relief structure may be greater than 100 nm. In some embodiments, a maximum duty cycle of the slanted surface-relief structure may be greater than 75%.

In some embodiments, the material layer may include a semiconductor substrate, a $SiO_2$ layer, a $Si_3N_4$ material layer, a titanium oxide layer, an alumina layer, a SiC layer, a $SiO_xN_y$ layer, an amorphous silicon layer, a spin on carbon (SOC) layer, an amorphous carbon layer (ACL), a diamond like carbon (DLC) layer, a $TiO_x$ layer, an $AlO_x$ layer, a $TaO_x$ layer, or a $HfO_x$ layer. In some embodiments, the intermediate mask layer may include an organic material. In some embodiments, the thin hard mask may include a metal or a metallic compound. In some embodiments, a thickness of the thin hard mask may be less than 20 nm. In some embodiments, an etch selectivity between the intermediate mask layer and the thin hard mask may be greater than 500:1. In some embodiments, the etch rate of the intermediate mask layer may be greater than three times of the etch rate of the material layer. In some embodiments, the etching parameters for etching the intermediate mask layer are different from the etching parameters for etching the material layer.

In some embodiments, the method also include coating the intermediate mask layer on top of the material layer, forming a thin hard mask layer on top of the intermediate mask layer, and etching the thin hard mask layer to form the thin hard mask.

According to certain embodiments, a method of fabricating a slanted surface-relief structure in a material layer may include forming a thin hard mask on top of a first intermediate mask layer, etching the first intermediate mask layer at a slant angle using the thin hard mask to form a first slanted intermediate mask, etching a second intermediate mask layer below the first intermediate mask layer at the slant angle using the first slanted intermediate mask to form a second slanted intermediate mask, and etching the material layer at the slant angle using the second slanted intermediate mask to form the slanted surface-relief structure in the material layer. The first intermediate mask layer may be characterized by a first etch rate greater than an etch rate of the material layer. The second intermediate mask layer may be characterized by a second etch rate greater than the first etch rate of the first intermediate mask layer.

In some embodiments, a minimum duty cycle of the slanted surface-relief structure is less than 30%. In some embodiments, the slant angle may be greater than 45° with respect to a surface normal of the material layer. In some embodiments, a thickness of the thin hard mask may be less than 20 nm.

In some embodiments, the method may also include coating the second intermediate mask layer on top of the material layer, coating the first intermediate mask layer on top of the second intermediate mask layer, forming a thin hard mask layer on top of the first intermediate mask layer, and etching the thin hard mask layer to form the thin hard mask.

According to certain embodiments, a slanted surface-relief structure for a waveguide display in a near-eye display system may include a substrate and a slanted surface-relief optical grating formed in the substrate. The minimum duty cycle of the slanted surface-relief optical grating may be less than 30%. The slant angle of the slanted surface-relief optical grating may be greater than 45° with respect to a surface normal of the substrate. The depth of the slanted surface-relief optical grating may be greater than 100 nm.

BRIEF DESCRIPTION OF THE DRAWINGS

Illustrative embodiments are described in detail below with reference to the following figures.

FIGS. 8A-8C illustrate an example of etching a deep slanted surface-relief grating using a hard mask according to certain embodiments.

FIG. 10A illustrates an example of patterning a hard mask layer according to certain embodiments. FIG. 10B illustrates an example of etching the intermediate mask layer using the patterned hard mask according to certain embodiments. FIG. 10C illustrates an example of etching the substrate using the slanted intermediate mask to form a deep slanted surface-relief grating on the substrate according to certain embodiments.

FIGS. 11A-11P illustrate examples of slanted surface-relief gratings with different grating duty cycles and depths fabricated using techniques disclosed herein according to certain embodiments.

Figure 1:
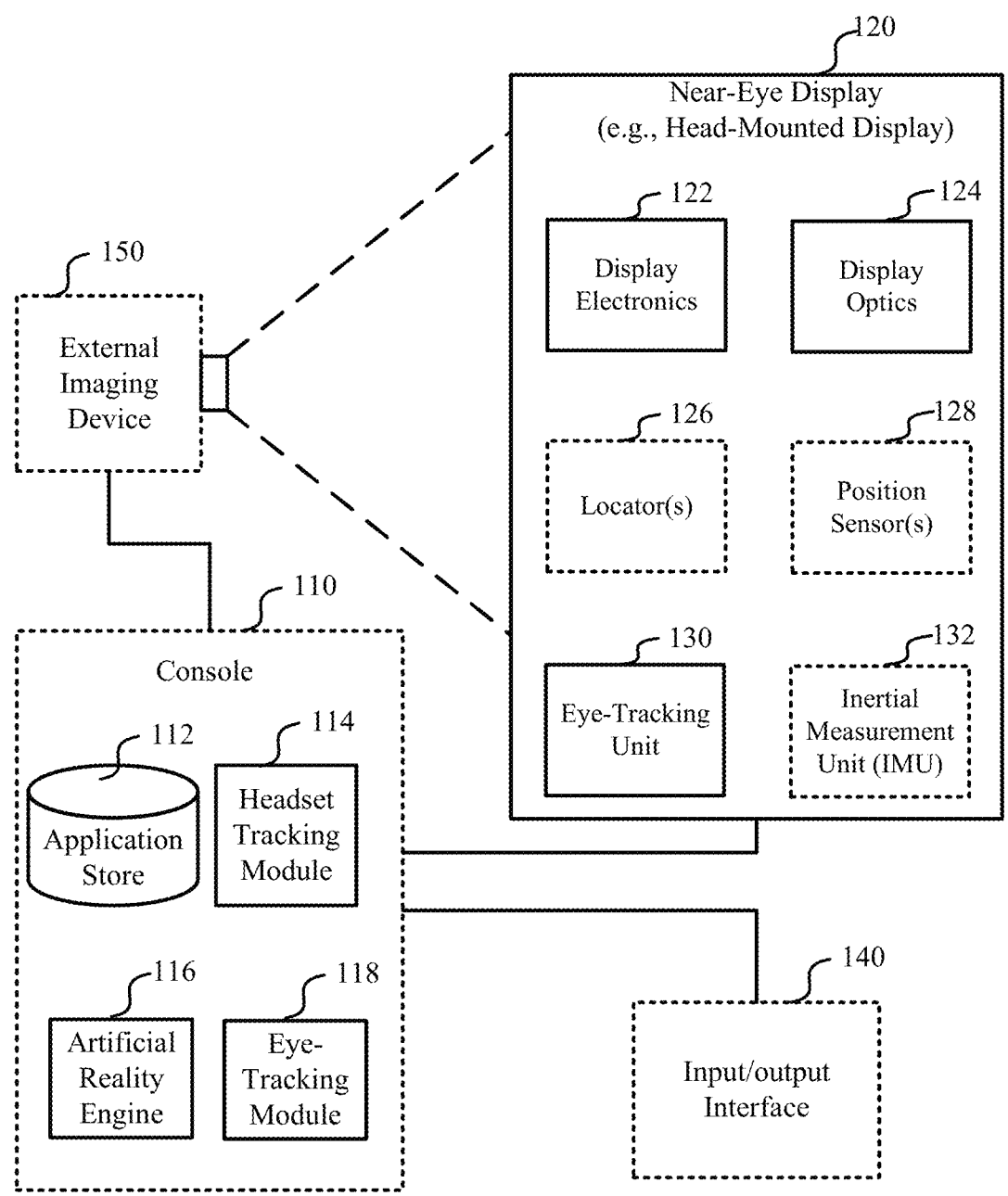
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to manufacturing slanted surface-relief structures. More specifically, and without limitation, this application relates to techniques for fabricating deep, slanted surface-relief structures having a wide range of duty cycles for waveguide-based displays. Techniques disclosed herein can be used to fabricate slanted surface-relief gratings with large slanted angles, small critical dimensions, wide ranges of grating duty cycles, and/or high depths at a high fabrication speed and yield. The slanted surface-relief gratings can be used as waveguide combines in waveguide-based displays to improve the field of view, increase the brightness or power efficiency, and reduce display artifacts (e.g., rainbow artifacts) of the waveguide-based displays.

In some embodiments, it is found that it is desirable to fabricate slanted structures for manipulating behaviors of light and/or electricity. Some of the benefits of the slanted structures may include a high efficiency of light transfer, a large variation in refractive indices, and/or the like. It is also found that the parallel slanted (with respect to the surface normal of the surface being etched) structures solve a problem unique to certain applications. As such, slanted structures may be used in many optical or electronic devices for manipulating behavior of light and/or electricity. For example, slanted gratings may be used as waveguide combiners in waveguide-based artificial reality (AR) display device. In some applications, to selectively couple display light and ambient light into and/or out of the waveguide and into user's eyes, improve field of view, increase brightness efficiency, reduce display artifacts (e.g., rainbow artifacts), and/or improve other performances of a waveguide display, a slanted surface-relief grating having a large range of grating duty cycles (e.g., from about 0.1 to about 0.9), large slant angles (e.g., greater than 30°, 45°, 60°, or larger), and high depths (e.g., greater than 100 nm) may be desired.

It may often be challenging to fabricate such slanted structures at a high production speed with a high fabrication accuracy and yield using either nanoimprint techniques or etching techniques. For example, it may be difficult to fabricate such deep slanted structures with a large range of duty cycles using imprint techniques without cracking or breaking at least some grating ridges of the mold, stamp, or the imprinted deep slanted structures. To etch a deep surface-relief structure, a thick etch mask layer may be needed to withstand high energy ions over a long etching time period. However, in slanted etching where the etchants are incident on the etch mask layer and the material layer to be etched (e.g., a substrate under the etch mask layer) at a slant angle greater than 0° (e.g., 30° or larger) with respect to the surface normal of the etch mask layer and the material layer to be etched, the shadowing effect of the thick etch mask layer may cause the line width, and thus the duty cycle (which may be defined as the ratio between the grating line width and the grating period), of the slanted structure to be much larger than the line width (or the duty cycle) of the pattern on the etch mask layer. In general, the thicker the etch mask layer and the larger the slant angle, the higher the shadowing effect and thus the greater the increase in grating line width or duty cycle. For example, the duty cycle of a slanted structure etched using a thick etch mask with a duty cycle of 0.1 may be 0.4 or higher.

According to certain embodiments, to increase the range of the duty cycles of the etched deep slanted structure, one or more intermediate mask layers may be used, together with a thin hard mask layer, to fabricate the deep slanted structure. For example, a thick intermediate mask layer including an organic material may be formed on a substrate to be etched. The organic material may have a much higher etch rate than (e.g., 3 times or higher of) the grating material (e.g., quartz, Si, or $Si_3N_4$). The organic material may also have a much higher etch selectivity over the thin hard mask layer, such as 500:1 or higher. The thin hard mask layer (e.g., a metal layer including chrome, copper, titanium, aluminum, or the like) may be formed on the intermediate mask layer. The thin hard mask layer may first be patterned to form a straight hard mask, and the thin straight hard mask may then be used in a slanted etching process to pattern the intermediate mask layer to form a slanted intermediate mask. Because the organic material of the intermediate mask layer has a high etch rate and a high etch selectivity with respect to the hard mask layer, the energy of the etchants (e.g., reactive ions) can be lower, and the hard mask layer can be thin. Because the hard mask can be thin, the shadowing effect caused by the hard mask in the slanted etching may be reduced, and the thick slanted intermediate mask may have a very small increase in duty cycle compared with the thin hard mask.

In a second slanted etching step, the thick slanted intermediate mask may be used as the mask to etch the next material layer under the thick intermediate mask layer, such as the substrate in which the slanted structure is to be fabricated or another intermediate mask layer. Because the thick intermediate mask is slanted, the thick slanted thick intermediate mask may have little or no shadowing effect in the subsequent slanted etching. In some embodiments, because the edge of the thick slanted intermediate mask may be etched in the subsequent slanted etching, the duty cycle of the thick slanted intermediate mask may be reduced during the etching, and thus the slanted structure formed in the substrate may have duty cycles less than the initial duty cycles of the thick slanted intermediate mask (which may be similar to the duty cycles of the hard mask). In this way, a slanted structure having low duty cycles (e.g., about 0.1 or lower)) and a large depth may be achieved.

In some embodiments, the two or more etching processes may be different, for example, using different etchants or other etching parameters. For example, a first etching process that has a much higher etch rate and a much higher etch selectivity for the intermediate mask layer than the hard mask layer may be used to etch the slanted intermediate mask. A second etching process that has a relatively high etch rate and etch selectivity between the next material layer (e.g., the substrate in which the slanted structure is to be fabricated) and the intermediate mask layer may be used to etch the next material layer using the slanted intermediate mask.

In some embodiments, the slanted structures may be fabricated on a material layer (e.g., an organic material layer rather than an inorganic substrate) having a much higher etch rate and etch selectivity compared with the hard mask layer. As such, the thickness of the hard mask layer can be reduced, thus reducing the increase in duty cycle of the etched structure caused by the shadowing effect of the hard mask layer. In addition, because the organic material layer may have a higher etch rate, the organic material layer may be etched much faster to form the deep slanted structure. Thus, the productivity or throughput of manufacturing the deep slanted structures may be improved.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140 that may each be coupled to an optional console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to, for example, FIGS. 2-4 and 18. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (mLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
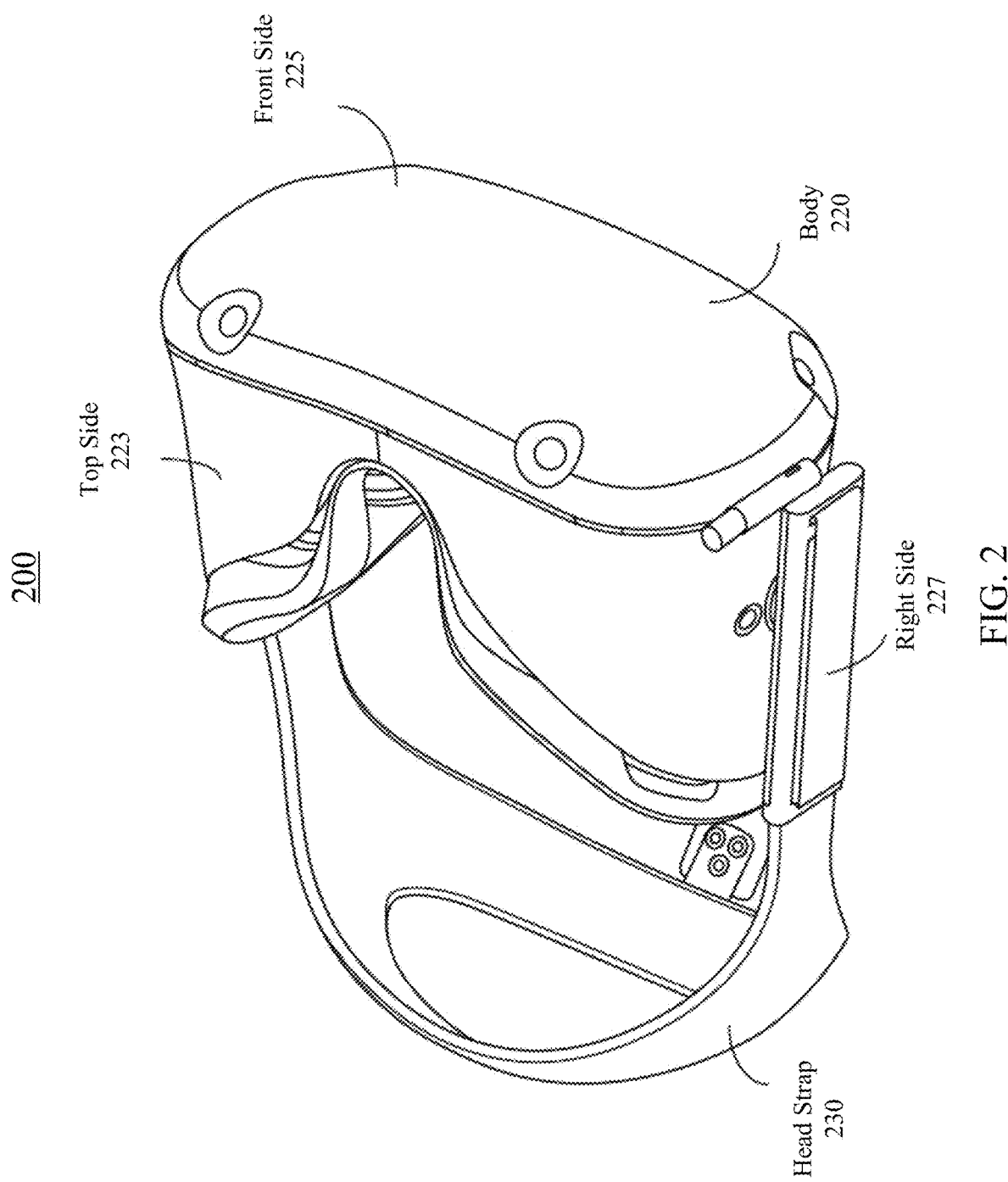
FIG. 2 is a perspective view of an example of a near-eye display in the form of a head-mounted display (HMD) device for implementing some of the examples disclosed herein.

FIG. 2 is a perspective view of an example of a near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
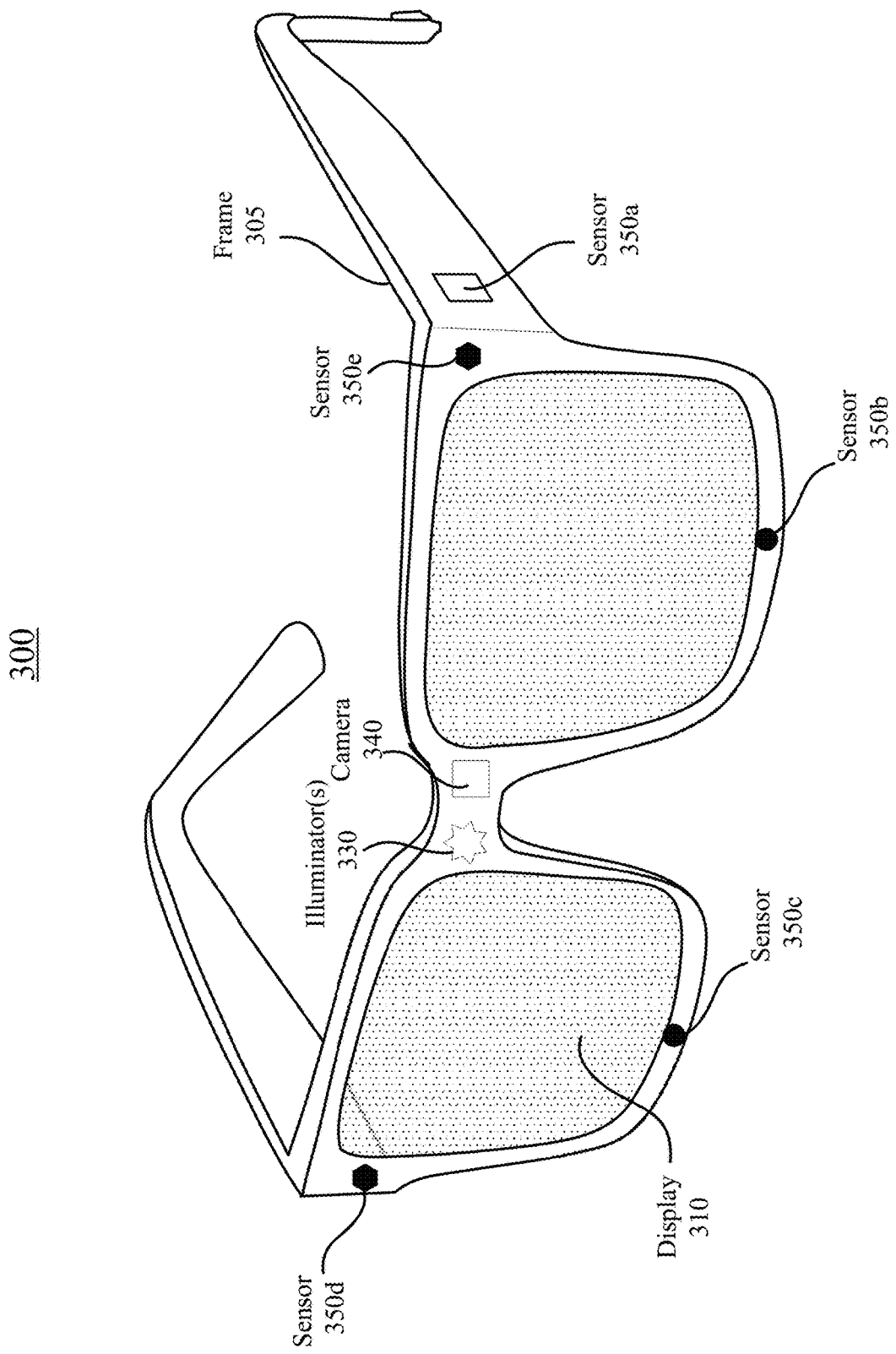
FIG. 3 is a perspective view of a simplified example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
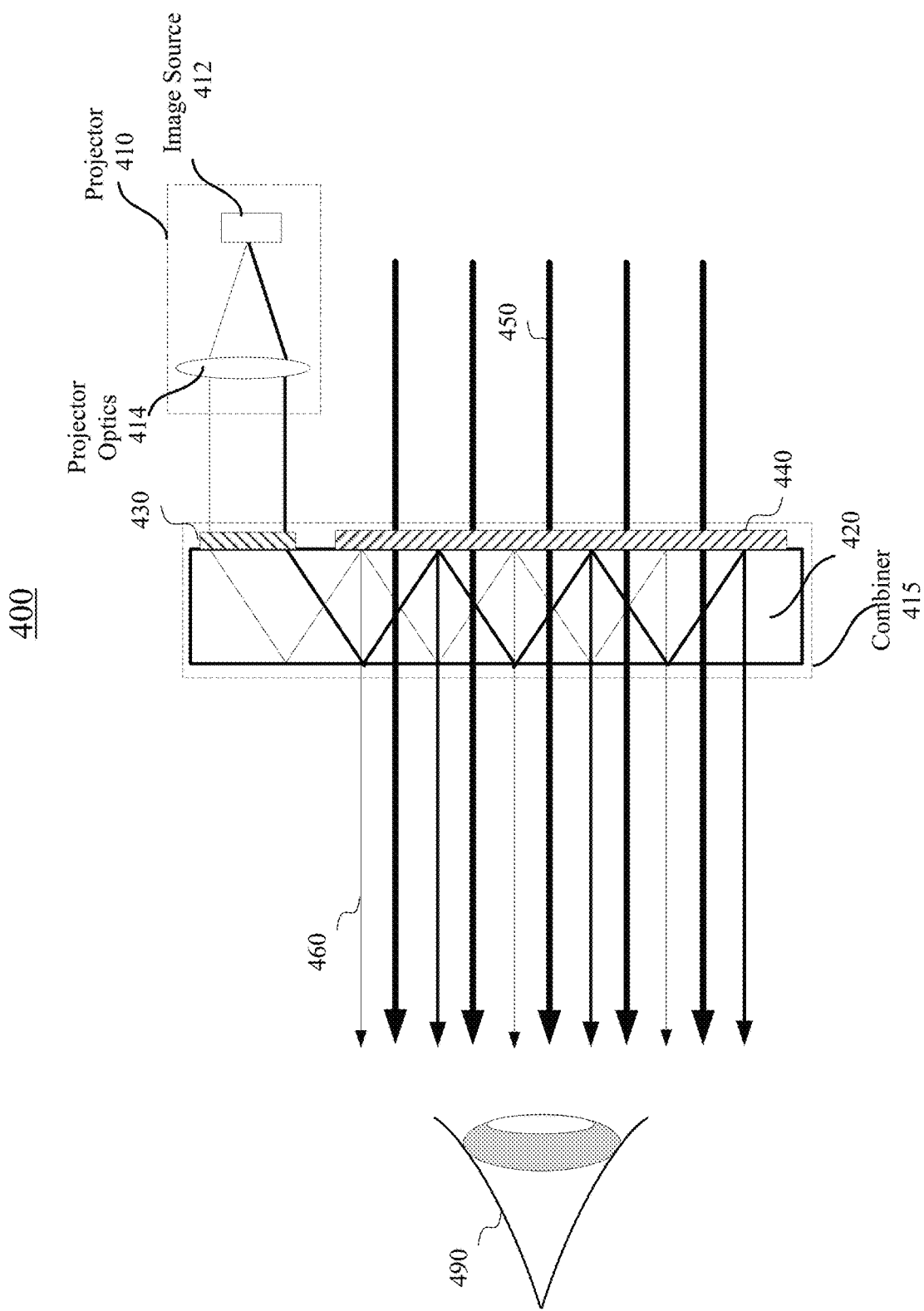
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
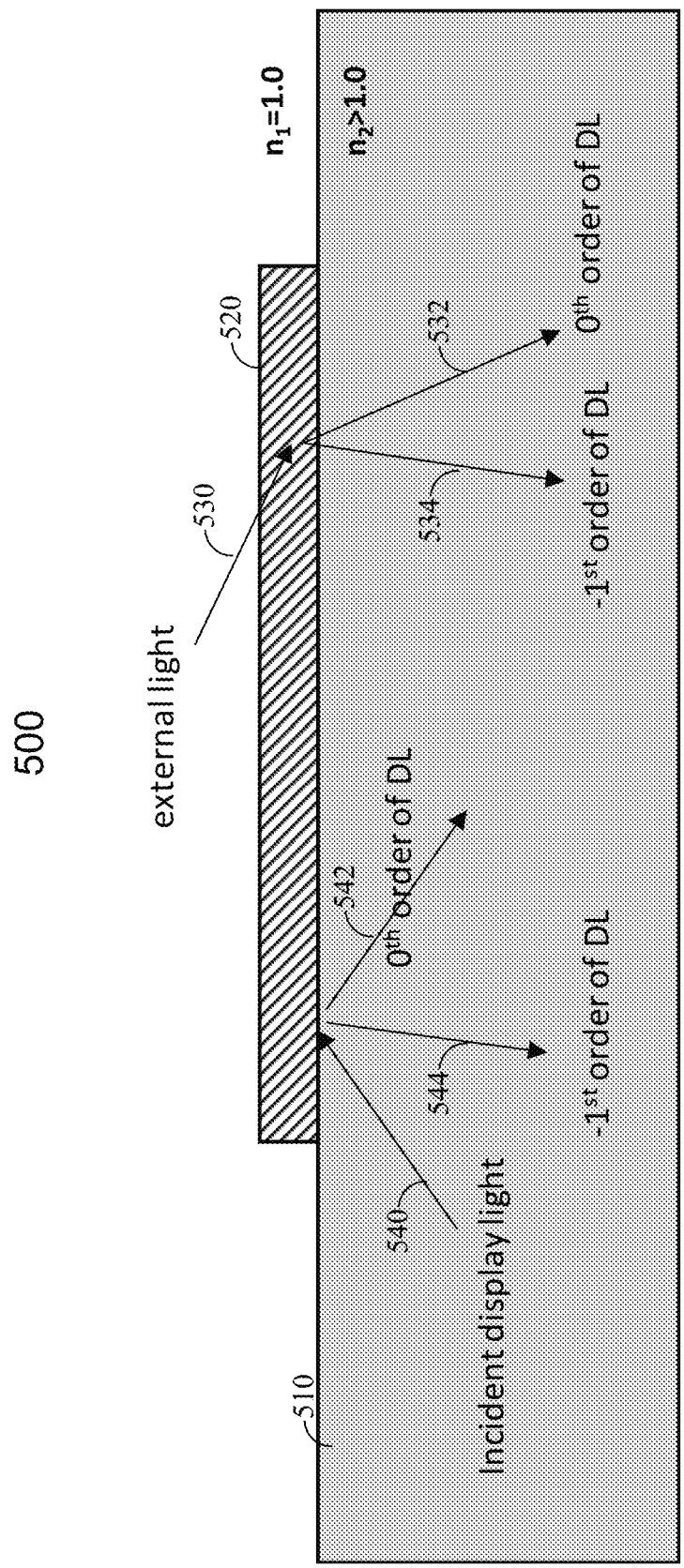
FIG. 5 illustrates propagations of display light and external light in an example waveguide display.

FIG. 5 illustrates propagations of incident display light 540 and external light 530 in an example of a waveguide display 500 including a waveguide 510 and a grating coupler 520. Waveguide display 500 may include, for example, combiner 415 of FIG. 4. Waveguide 510 may be a flat or curved transparent substrate with a refractive index $n_2$ greater than the free space refractive index $n_1$ (i.e., 1.0). Grating coupler 520 may include, for example, a Bragg grating or a surface-relief grating.

Incident display light 540 may be coupled into waveguide 510 by, for example, input coupler 430 of FIG. 4 or other couplers (e.g., a prism or slanted surface) described above. Incident display light 540 may propagate within waveguide 510 through, for example, total internal reflection. When incident display light 540 reaches grating coupler 520, incident display light 540 may be diffracted by grating coupler 520 into, for example, a $0^{th}$ order diffraction (i.e., reflection) light 542 and a −1st order diffraction light 544. The $0^{th}$ order diffraction may continue to propagate within waveguide 510, and may be reflected by the bottom surface of waveguide 510 towards grating coupler 520 at a different location. The −1st order diffraction light 544 may be coupled (e.g., refracted) out of waveguide 510 towards the user's eye, because a total internal reflection condition may not be met at the bottom surface of waveguide 510 due to the diffraction angle of the $−1^{st}$ order diffraction light 544.

External light 530 may also be diffracted by grating coupler 520 into, for example, a $0^{th}$ order diffraction light 532 or a −1st order diffraction light 534. The $0^{th}$ order diffraction light 532 or the −1st order diffraction light 534 may be refracted out of waveguide 510 towards the user's eye. Thus, grating coupler 520 may act as an input coupler for coupling external light 530 into waveguide 510, and may also act as an output coupler for coupling incident display light 540 out of waveguide 510. As such, grating coupler 520 may act as a combiner for combining external light 530 and incident display light 540 and send the combined light to the user's eye.

In order to diffract light at a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
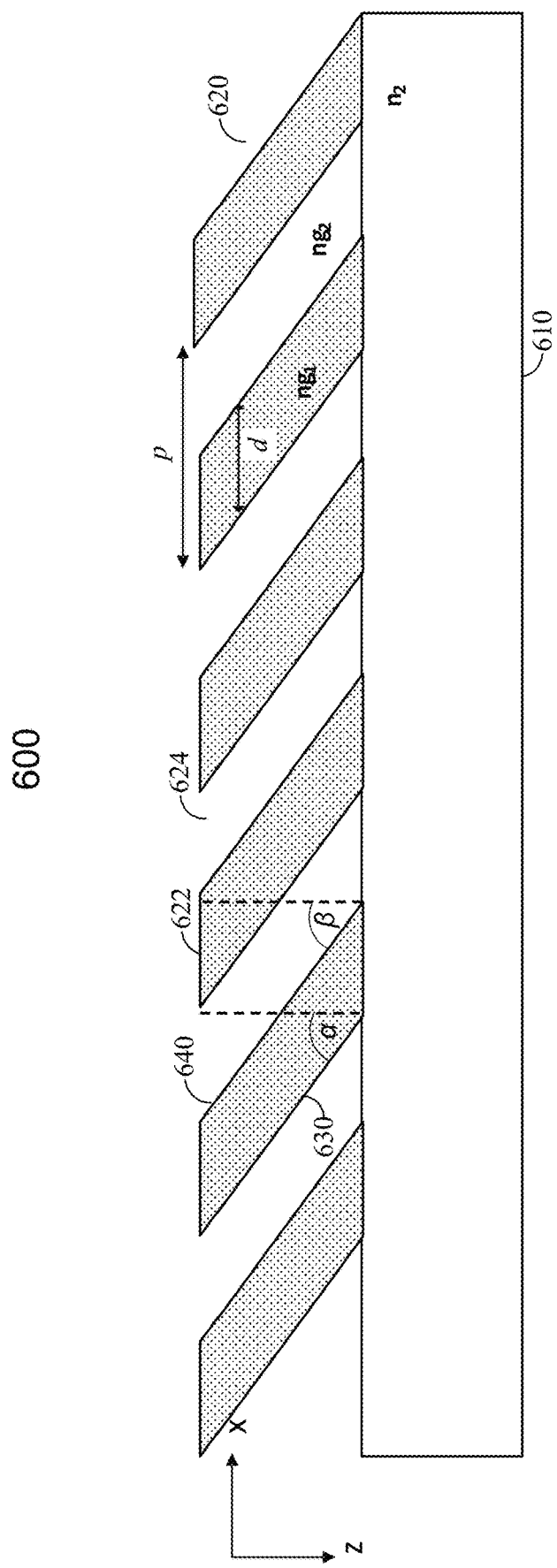
FIG. 6 illustrates an example of a slanted grating coupler in a waveguide display according to certain embodiments.

FIG. 6 illustrates an example slanted grating 620 in an example waveguide display 600 according to certain embodiments. Slanted grating 620 may be an example of output couplers 440 or grating coupler 520. Waveguide display 600 may include slanted grating 620 on a waveguide 610, such as substrate 420 or waveguide 510. Slanted grating 620 may act as a grating coupler for couple light into or out of waveguide 610. In some embodiments, slanted grating 620 may include a periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, $HfO_x$, etc.). Each ridge 622 may include a leading edge 630 with a slant angel α and a trailing edge 640 with a slant angle β. In some embodiments, leading edge 630 and training edge 640 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle β may be less than 20%, 10%, 5%, 1%, or less. In some embodiments, slant angle α and slant angle β may range from, for example, about 30° or less to about 70% or larger.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The slanted grating may be fabricated using many different nanofabrication techniques. The nanofabrication techniques generally include a patterning process and a post-patterning (e.g., over-coating) process. The patterning process may be used to form slanted ridges of the slanted grating. There may be many different nanofabrication techniques for forming the slanted ridges. For example, in some implementations, the slanted grating may be fabricated using lithography techniques including slanted etching. In some implementations, the slanted grating may be fabricated using nanoimprint lithography (NIL) molding techniques. The post-patterning process may be used to over-coat the slanted ridges and/or to fill the gaps between the slanted ridges with a material having a different refractive index than the slanted ridges. The post-patterning process may be independent from the patterning process. Thus, a same post-patterning process may be used on slanted gratings fabricated using any pattering technique.

Techniques and processes for fabricating slanted gratings described below are for illustration purposes only and are not intended to be limiting. A person skilled in the art would understand that various modifications may be made to the techniques described below. For example, in some implementations, some operations described below may be omitted. In some implementations, additional operations may be performed to fabricate the slanted grating. Techniques disclosed herein may also be used to fabricate other slanted structures on various materials.

Figure 7A:
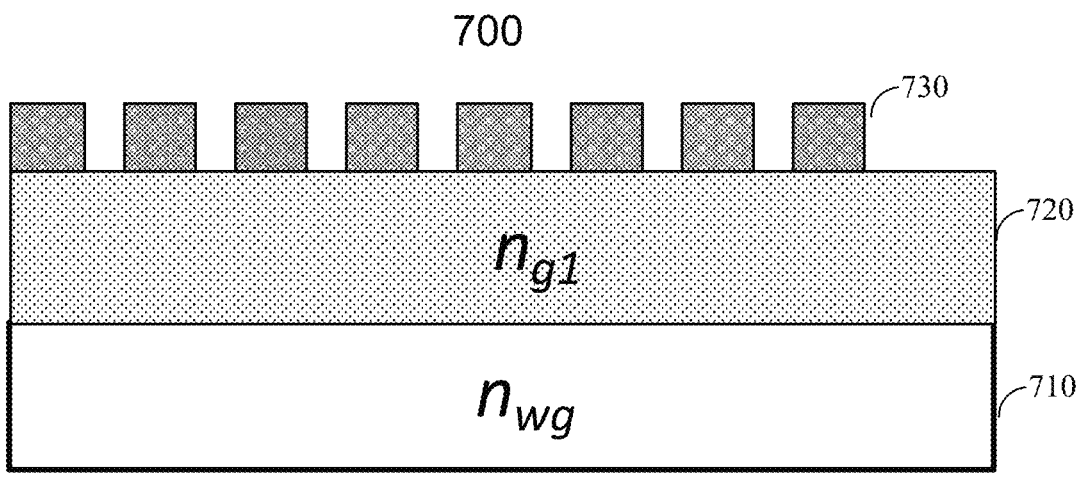
FIGS. 7A-7C illustrate an example of a process for fabricating a slanted surface-relief structure by slanted etching according to certain embodiments.
Figure 7B:
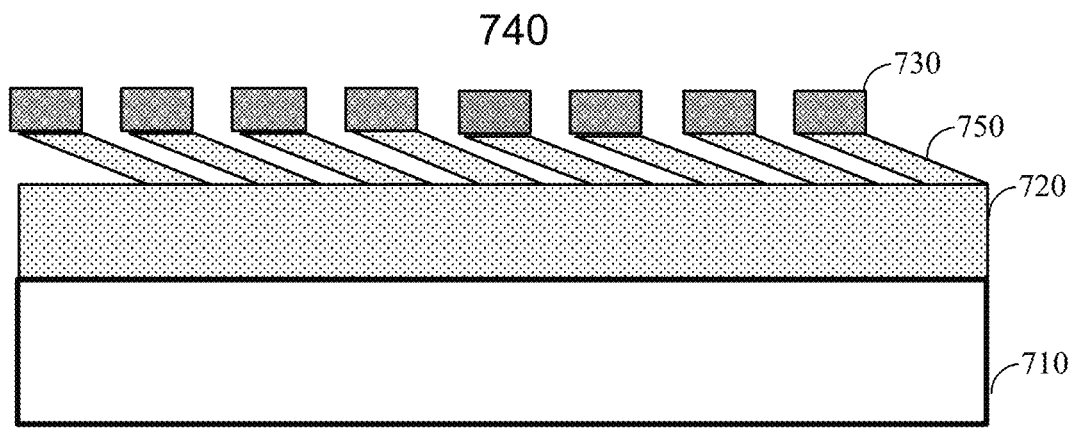
Figure 7C:
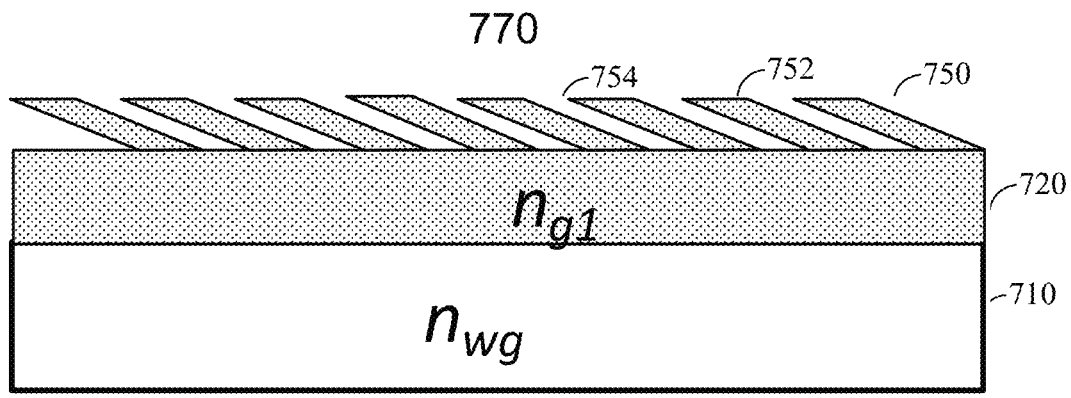

FIGS. 7A-7C illustrate an example of a process for fabricating a slanted surface-relief grating by slanted etching according to certain embodiments. FIG. 7A shows a structure 700 after a lithography process, such as a photolithography or electron beam lithography process. Structure 700 may include a substrate 710 that may be used as the waveguide of a waveguide display described above, such as a glass or quartz substrate. In some embodiments, structure 700 may also include a layer of grating material 720, such as $Si_3N_4$, $SiO_2$, titanium oxide, alumina, and the like. Substrate 710 may have a refractive index $n_{wg}$, and the layer of grating material 720 may have a refractive index $n_{g1}$. In some embodiments, the layer of grating material 720 may be a part of substrate 710. A mask layer 730 with a desired pattern may be formed on top of the layer of grating material 720. Mask layer 730 may include, for example, a photoresist material, a metal (e.g., copper, chrome, titanium, aluminum, or molybdenum), an intermetallic compound (e.g., MoSiON), or an organic material (e.g., polymer). Mask layer 730 may be referred to as a hard mask layer. Mask layer 730 may be formed by, for example, an optical projection (using a photomask) or electron beam lithography process, a nano-imprint lithography (NIL) process, a multi-beam interference process, and the like.

FIG. 7B shows a structure 740 after a slanted etching process, such as a dry etching process (e.g., reactive ion etching (RIE), inductively coupled plasma (ICP) etching, deep silicon etching (DSE), ion beam etching (IBE), or variations of IBE). The slanted etching process may include one or more sub-steps. The slanted etching may be performed by, for example, rotating structure 700 with respect to the direction of the etching beam based on the desired slant angle and etching the layer of grating material 720 by the etching beam. After the etching, a slanted grating 750 may be formed in the layer of grating material 720.

FIG. 7C shows a structure 770 after mask layer 730 is removed. Structure 770 may include substrate 710, the layer of grating material 720, and slanted grating 750. Slanted grating 750 may include a plurality of ridges 752 and grooves 754. Techniques such as plasma or wet etching may be used to strip mask layer 730 with appropriate chemistry. In some implementations, mask layer 730 may not be removed and may be used as part of the slanted grating. The width of each ridge 752 may be referred to as the line width. In some embodiments, the minimum feature size of mask layer 730 or the minimum line width of ridges 752 (which may be referred to as the critical dimension (CD) of a process) that can be reliably manufactured using the process may be limited due to, for example, the wavelength of the light used in the photolithography, the numerical aperture of the photolithography system, and other process-related factors (which may be referred to as $k_1$ factor).

Subsequently, in some implementations, a post-patterning (e.g., over-coating) process may be performed to over-coat slanted grating 750 with a material having a refractive index higher or lower than the material of ridges 752. For example, as described above, in some embodiments, a high refractive index material, such as Hafnia, Titania, Tungsten oxide, Zirconium oxide, Gallium sulfide, Gallium nitride, Gallium phosphide, silicon, and a high refractive index polymer, may be used for the over-coating. In some embodiments, a low refractive index material, such as silicon oxide, alumina, porous silica, or fluorinated low index monomer (or polymer), may be used for the over-coating. As a result, the difference between the refractive index of ridges 752 and the refractive index of the over-coating material in grooves 754 may be greater than 0.1, 0.2, 0.3, 0.5, 1.0, or higher.

As described above, to selectively couple display light and/or ambient light into and/or out of the waveguide and into user's eyes, improve the field of view, increase brightness or power efficiency, reduce display artifacts (e.g., rainbow artifacts), and/or improve other performances of a waveguide display, a slanted surface-relief grating having a large range of grating duty cycles (e.g., from about 0.1 to about 0.9), large slant angles (e.g., greater than 30°, 45°, 60°, or larger), and high depths (e.g., greater than 100 nm) may be desired. As also described above, it may be challenging to etch such slanted structures at a high production speed with a high fabrication accuracy and yield. For example, to etch a deep surface-relief structure using, for example, ion beams or plasma, the energy and dosage of the ions may need to be high and the etch time may be long. As such, a thick etch mask layer may be needed in order to withstand the high energy ions over a long etching time period. In slanted etching where the etchants are incident on the etch mask layer and the material layer to be etched (e.g., a substrate under the etch mask layer) at a slant angle greater than 0° (e.g., 30° or larger) with respect to the surface normal of the etch mask layer and the material layer to be etched, the shadowing effect of the thick etch mask layer may cause the line width, and thus the duty cycle, of the slanted structure to be much larger than the line width (or the duty cycle) of the pattern on the etch mask layer.

FIG. 8A illustrates an example of etching a slanted surface-relief grating using a hard mask according to certain embodiments. As illustrated, a structure 800 may be formed after, for example, a lithography process, such as a photolithography process using a photomask, an electron beam lithography process, or a NIL process. Structure 800 may include a substrate 810 in which a surface-relief structure may be formed. A hard etch mask layer may be deposited and patterned on top of substrate 810 by the lithography process to form a hard etch mask 820. As described above, the hard etch mask layer may include, for example, a photoresist material, a metal (e.g., copper, chrome, titanium, aluminum, or molybdenum), an intermetallic compound (e.g., MoSiON), or an organic material (e.g., polymer). Hard etch mask 820 may include a grating structure, where a width of the grating ridge is d, a period of the grating structure is p (not shown in FIG. 8A), and a height of hard etch mask 820 is H.

FIG. 8B illustrates an example of etching a deep slanted surface-relief grating using a hard etch mask according to certain embodiments. As shown in FIG. 8B, to etch a surface-relief grating with a slant angle α, ion beams 830 may bombard structure 800 at an angle α with respect to the surface normal of substrate 810. For example, a plate holding substrate 810 in an etching system may be tilted by an angle α with respect to the direction of ion beams 830. Due to the finite height H of hard etch mask 820 and the slanted etching, hard etch mask 820 may block ions from reaching an area with a dimension d' under hard etch mask 820, where the dimension d' of the area shadowed by hard etch mask 820 may be represented by:

$$d' = d + \frac{H}{\tan(90° - \alpha)}.$$

As such, the effective duty cycle of the fabricated slanted surface-relief grating may be:

$$DC_{eff} = \frac{d'}{p} = \frac{d}{p} + \frac{H}{p \times \tan(90° - \alpha)} = DC_{mask} + \frac{H}{p \times \tan(90° - \alpha)}.$$

FIG. 8C illustrates an example of etching a deep slanted surface-relief grating using a hard mask according to certain embodiments. In FIG. 8C, ion beams 840 may bombard structure 800 at an angle α' with respect to the surface normal of substrate 810, where α' is greater than α. Due to the shadowing effect of the hard etch mask, the dimension d" of the area of substrate 810 blocked by hard etch mask 820 may be larger than d' shown in FIG. 8B.

As shown above and indicated by the equations above, the thicker the etch mask layer and the larger the slant angle, the higher the shadowing effect and thus the higher the increase in the grating line width or duty cycle of the slanted structure. For example, the duty cycle of a slanted structure etched using a thick etch mask having a duty cycle of 0.1 may be 0.4 or higher. In some cases (e.g., when the grating period is large), reducing the feature size of the thick etch mask may help to reduce the duty cycle of the slanted structure. However, as described above, the minimum feature size of the thick etch mask layer that can be reliably manufactured using a process (or the CD for the process) may be limited. Thus, reducing the feature size of the thick etch mask may not be sufficient to achieve a low duty cycle, such as about 0.1.

According to certain embodiments, to increase the range of the duty cycle of the etched deep slanted structure, one or more intermediate mask layers may be used, together with a thin hard mask layer, to fabricate the deep slanted structure. In one example, a thick intermediate mask layer including an organic material may be formed on top of a substrate to be etched. The organic material may have a much higher etch rate than (e.g., 3 times or higher of) the grating material (e.g., quartz, Si, or Si$_3$N$_4$). The organic material may also have a much higher etch selectivity over the thin hard mask layer, such as 500:1 or higher. A thin hard mask layer (e.g., a metal layer including, for example, chrome, copper, titanium, aluminum, and the like) may be formed on top of the intermediate mask layer. The thin hard mask layer may first be patterned using a lithography process, such as photolithography or e-beam lithography, to form a straight hard mask.

In a first slanted etching process, the thin straight hard mask may be used to pattern the intermediate mask layer to form a slanted intermediate mask, where the ion beams may bombard the thin straight hard mask and the intermediate mask layer at an angle substantially equal to the slanted angle of the slanted surface-relief structure to be fabricated. Because the organic material of the intermediate mask layer has a high etch rate and a high etch selectivity with respect to the hard mask layer, the energy of the etchants (e.g., reactive ions) can be lower, and the hard mask layer can be thin, such as about 10 nm or thinner. Because the hard mask is thin, the shadowing effect caused by the hard mask during the slanted etching may be reduced, and the thick slanted intermediate mask may have a very small increase in duty cycle compared with the thin hard mask.

In a second slanted etching step, the thick slanted intermediate mask may be used as the mask to etch the next material layer under the thick intermediate mask layer, such as the substrate in which the slanted structure is to be fabricated or another intermediate mask layer. Because the thick intermediate mask is slanted at the desired slant angle, the thick slanted thick intermediate mask may have little or no shadowing effect in the subsequent slanted etching. In some embodiments, because the edge of the thick slanted intermediate mask may be etched during the subsequent slanted etching, the duty cycle of the thick slanted intermediate mask may be reduced, and thus the slanted structure formed in the substrate may have duty cycles less than the initial duty cycles of the thick slanted intermediate mask (which may be similar to the duty cycles of the hard mask). In this way, a slanted structure having a small minimum duty cycle (e.g., about 0.1 or lower) and a large depth may be achieved.

Figure 9A:
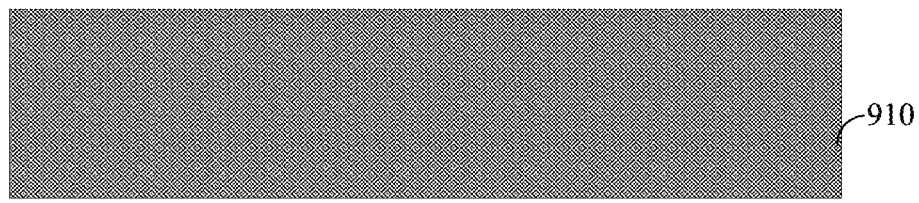
FIGS. 9A-9C illustrate an example of a process for coating mask layers on top of a substrate for etching a deep slanted surface-relief grating on the substrate according to certain embodiments.
Figure 9B:
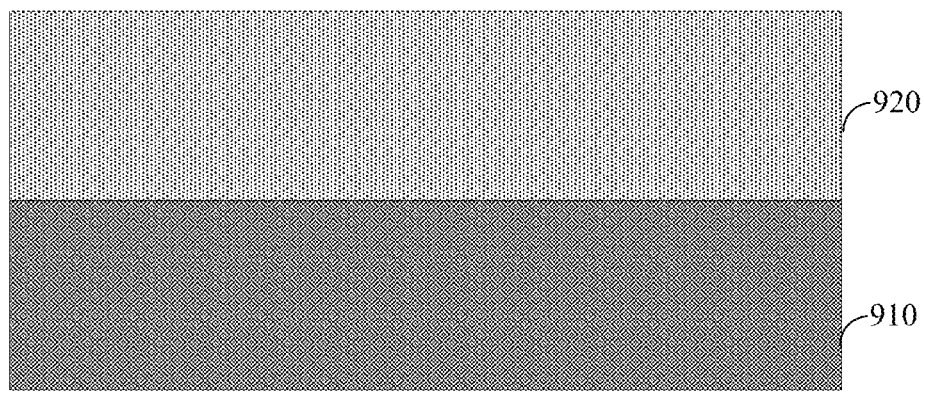
Figure 9C:
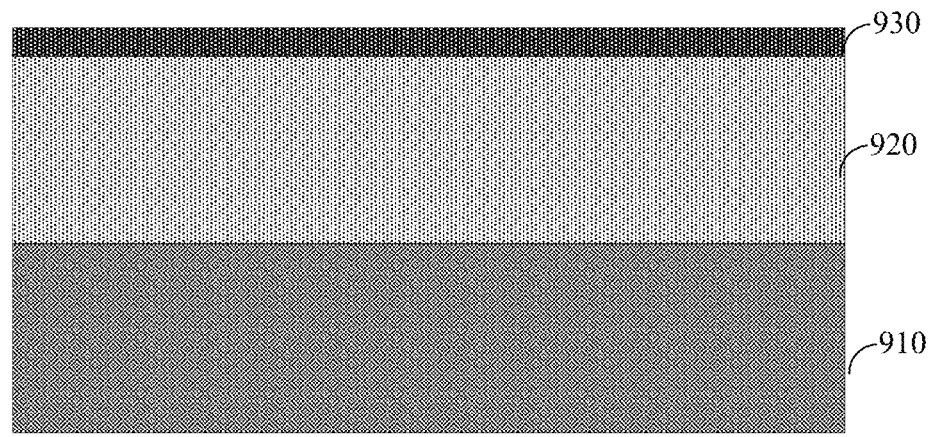

FIGS. 9A-9C illustrate an example of a process for coating mask layers on top of a substrate for etching a deep slanted surface-relief grating on the substrate according to certain embodiments. FIG. 9A shows a substrate 910, in which the deep slanted surface-relief grating is to be fabricated. As described above, substrate 910 may include, for example, silicon dioxide, silicon nitride, titanium dioxide, alumina, polymer, PMMA, ceramic, SiC, SiO$_x$N$_y$, an amorphous silicon layer, a spin on carbon (SOC) layer, an amorphous carbon layer (ACL), a diamond like carbon (DLC) layer, TiO$_x$, AlO$_x$, TaO$_x$, HfO$_x$, and the like. In one example, substrate 910 may include a quartz substrate, which may include a flat or a curved surface.

FIG. 9B illustrates an intermediate mask layer 920 formed on top of substrate 910. As described above, intermediate mask layer 920 may include an organic material that may have a much higher etch rate and etch selectivity compared with a hard mask layer, such as a hard mask layer including a metal or a metallic compound. In one example, intermediate mask layer 920 may include an optical densifying organic material layer. In some embodiments, intermediate mask layer 920 may be formed on top of substrate 910 using spin coating techniques. In some embodiments, intermediate mask layer 920 may be deposited on top of substrate 910 through, for example, chemical vapor deposition (CVD).

FIG. 9C illustrates a thin hard mask layer 930 formed on top of intermediate mask layer 920. As described above, thin hard mask layer 930 may include, for example, a metal (e.g., copper, chrome, titanium, aluminum, or molybdenum) or an intermetallic compound (e.g., MoSiON). In some embodiments, thin hard mask layer 930 may have a thickness less than, for example, 20 nm, such as about 10 nm or thinner. Substrate 910 with one or more intermediate mask layers 920 and a thin hard mask layer 930 may be etched in two or more steps as described in detail below to fabricate a deep slanted surface-relief structure, such as a grating with fixed or varying grating parameters including, for example, line width, grating period, duty cycle, or depth.

Figure 10A:
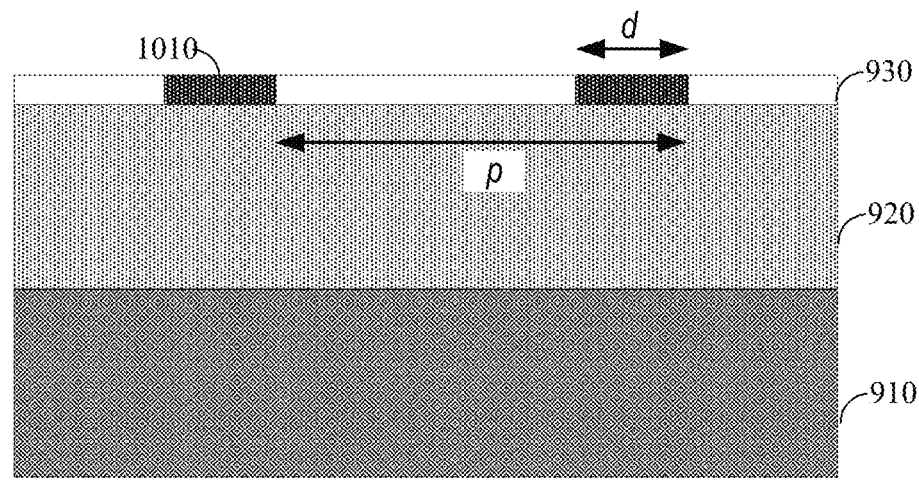
FIGS. 10A-10C illustrate an example of a process for etching a deep slanted surface-relief grating on a substrate using a slanted intermediate mask according to certain embodiments.
Figure 10B:
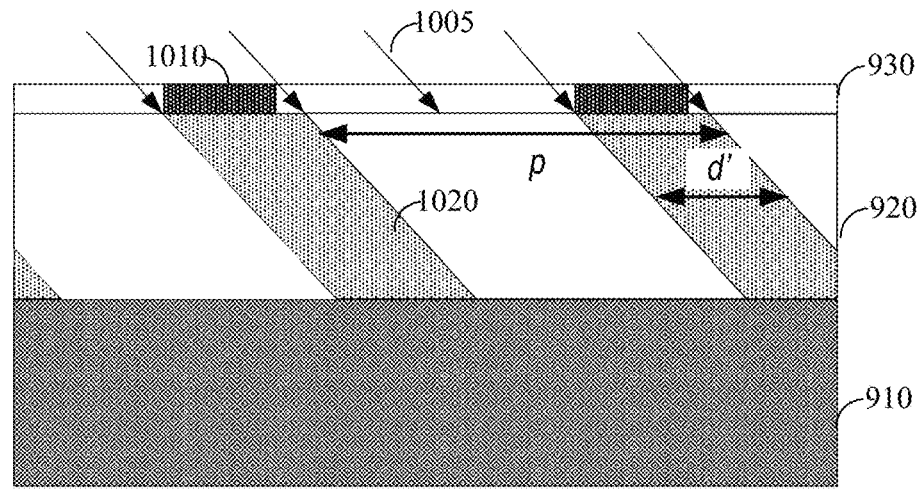
Figure 10C:
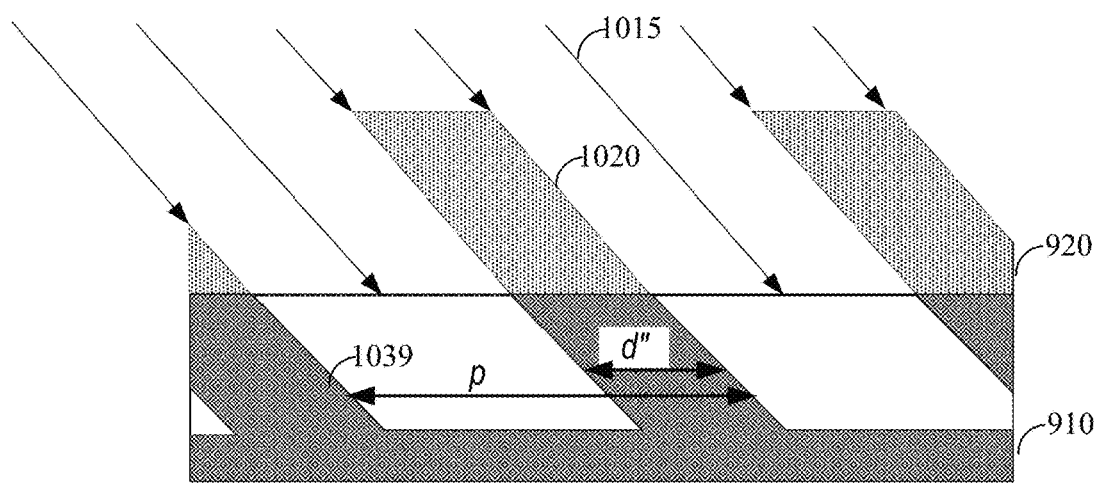

FIGS. 10A-10C illustrate an example of a process for etching a deep surface-relief grating in a substrate using a slanted intermediate mask according to certain embodiments. The process described with respect to FIGS. 10A-10C may be used to etch a substrate coated with two or more mask layers as shown in FIG. 9C.

FIG. 10A illustrates an example of patterning a hard mask layer (e.g., hard mask layer 930) according to certain embodiments. As described above, hard mask layer 930 may be patterned using various lithography techniques. For example, hard mask layer 930 may be patterned using a photolithography process, where a photoresist layer may be formed on hard mask layer 930 and the photoresist layer may be exposed to light through a photomask. The photoresist layer may be developed to remove exposed or unexposed regions of the photoresist layer (depending on whether the photoresist is positive or negative photoresist), and may be used as the mask to etch hard mask layer 930. A hard etch mask 1010 may be formed in hard mask layer 930 after the process. In some other embodiments, e-beam lithography or NIL process may be used to form hard etch mask 1010. As illustrated, hard etch mask 1010 may include a pattern that has a feature size d and a period p.

FIG. 10B illustrates an example of etching an intermediate mask layer (e.g., intermediate mask layer 920) using the patterned hard etch mask 1010 according to certain embodiments. As shown in FIG. 10B, an ion beam 1005 may be accelerated to bombard hard etch mask 1010 and intermediate mask layer 920 at a desired slant angle to etch a slanted intermediate mask 1020 in intermediate mask layer 920. The period of slanted intermediate mask 1020 may be approximately equal to period p of hard etch mask 1010. Because hard etch mask 1010 is thin, such as less than about 20 nm or 10 nm, the shadowing effect of hard etch mask 1010 due to the finite thickness of hard etch mask 1010 and the slanted etching may be small. As such, the line width d' of slanted intermediate mask 1020 may be approximately equal to feature size d of hard etch mask 1010. Thus, the duty cycle of slanted intermediate mask 1020 may be approximately equal to the duty cycle of hard etch mask 1010. Ion beams 1005 may include, for example, hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, COS, $SF_6$, $Cl_2$, $BCl_3$, HBr, $H_2$, Ar, He, or Ne). In various embodiments, the etching process for etching slanted intermediate mask 1020 may have a much higher etch rate and a much higher etch selectivity for intermediate mask layer 920 compared with hard etch mask 1010. For example, appropriate ions and/or reactive gases (e.g., $O_2$, CO, $CO_2$, $N_2O$, $N_2$, $NH_3$, or the like) may be selected to achieve the desired etch rate and selectivity.

FIG. 10C illustrates an example of etching a substrate (e.g., substrate 910) using slanted intermediate mask 1020 to form a deep slanted surface-relief grating 1030 in substrate 910 according to certain embodiments. As shown in FIG. 10C, an ion beam 1015 may be accelerated to bombard slanted intermediate mask 1020 and substrate 910 at a desired slant angle to etch the deep slanted surface-relief grating 1030 in substrate 910. The period of deep slanted surface-relief grating 1030 may be approximately equal to the period (p) of hard etch mask 1010 and the period (p) of slanted intermediate mask 1020. Because slanted intermediate mask 1020 is slanted with a slant angle approximately equal to the desired slant angle of deep slanted surface-relief grating 1030, the shadowing effect of slanted intermediate mask 1020 may be very small. In addition, in some embodiments, the edge of slanted intermediate mask 1020 may be etched during the slanted etching of substrate 910, and thus the duty cycle of slanted intermediate mask 1020 may be reduced. As a result, deep slanted surface-relief grating 1030 formed in substrate 910 may have a duty cycle less than the initial duty cycle of slanted intermediate mask 1020 (which may be similar to or slightly greater than the duty cycle of hard etch mask 1010). As such, the line width d" of deep slanted surface-relief grating 1030 may be approximately equal to the line width d' of slanted intermediate mask 1020 and the feature sized of hard etch mask 1010. Thus, the duty cycle of deep slanted surface-relief grating 1030 may be approximately equal to the duty cycle of hard etch mask 1010. Ion beams 1015 may include, for example, hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, COS, $SF_6$, $Cl_2$, $BCl_3$, HBr, $H_2$, Ar, He, or Ne). In various embodiments, the etching process for etching substrate 910 may have a relatively high etch rate and etch selectivity for substrate 910 with respect to slanted intermediate mask 1020. For example, appropriate ions and/or reactive gases (e.g., $O_2$, CO, $CO_2$, $N_2O$, $N_2$, $NH_3$, or the like) may be selected to achieve the etch rate and selectivity.

FIGS. 11A-11P illustrate examples of slanted surface-relief gratings with different grating duty cycles fabricated using techniques disclosed herein according to certain embodiments. The designed duty cycles of the examples of slanted surface-relief gratings shown in FIGS. 11A-11P range from about 0.1 to about 0.8. For example, the designed duty cycle of the slanted surface-relief grating shown in FIG. 11A is about 0.1.

Figure 12:
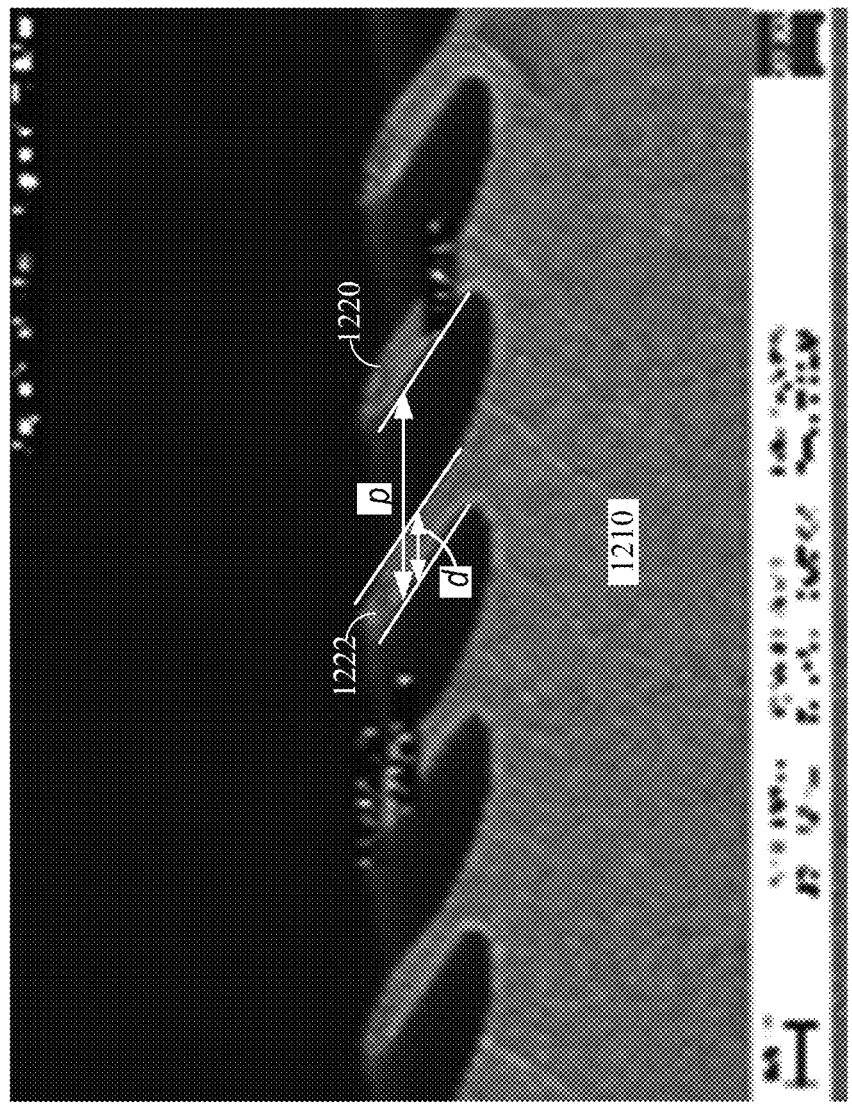
FIG. 12 illustrates an example of a slanted surface-relief grating fabricated using techniques disclosed herein according to certain embodiments.

FIG. 12 is a microscopic image 1200 depicting an example of a slanted surface-relief grating 1220 fabricated in a quartz substrate 1210 using techniques disclosed herein according to certain embodiments. From microscopic image 1200, parameters of slanted surface-relief grating 1220, such as the grating period p, line width d of grating ridges 1222, the depth of grating ridges 1222, and the slant angles of the leading edges and trailing edges of grating ridges 1222, may be measured. In some cases, linewidth d may not be uniform throughout the depth of a grating ridge 1222. For example, the top of grating ridge 1222 may be narrower than the bottom of grating ridge 1222. In the example shown in FIG. 12, the linewidth d and/or the grating period p may be measured at the middle of grating ridges 1222.

Figure 13:
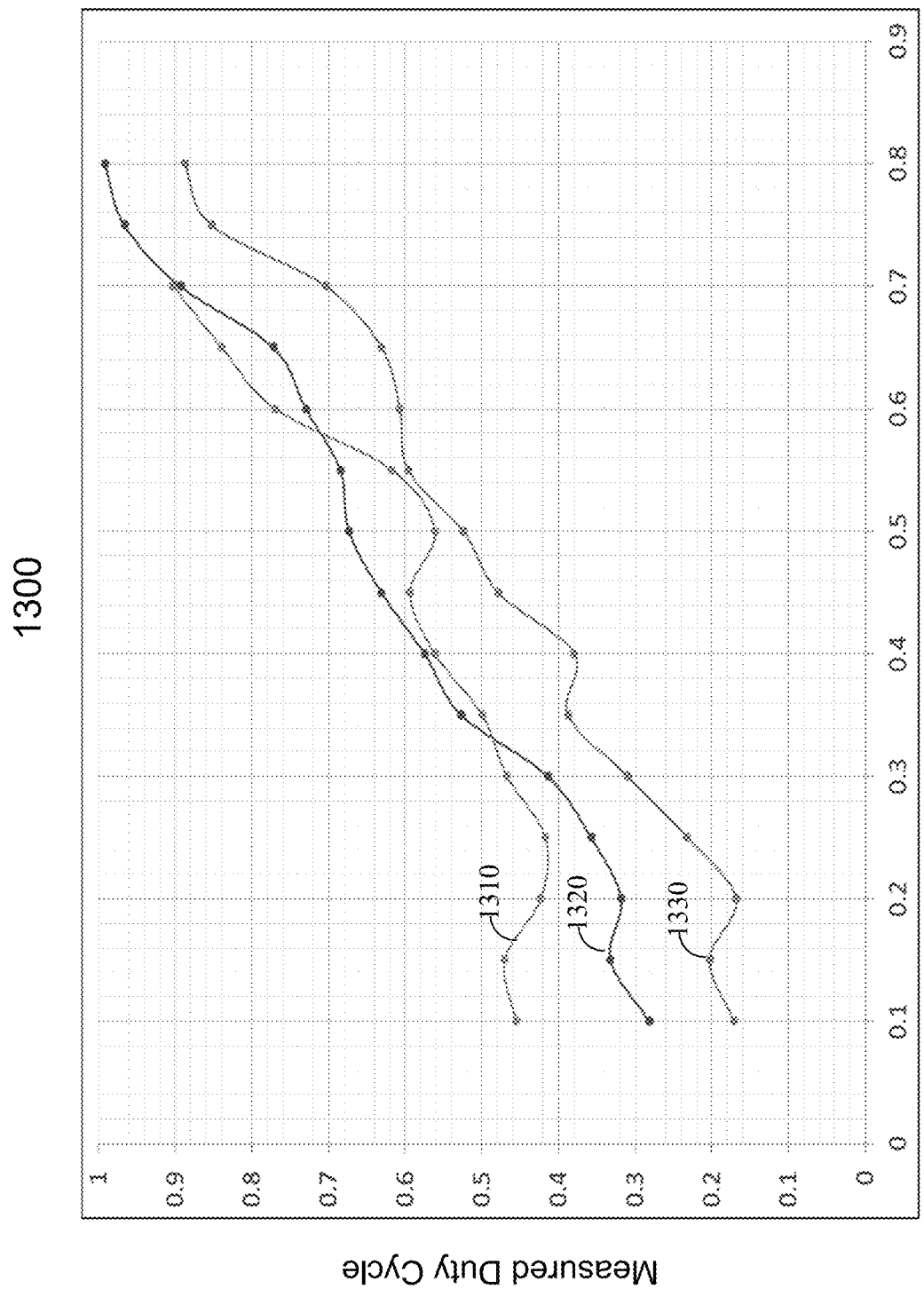
FIG. 13 illustrates measured duty cycles of examples of slanted surface-relief gratings with different grating duty cycles fabricated using various techniques including techniques disclosed herein according to certain embodiments.

FIG. 13 is a diagram 1300 illustrating measured duty cycles of examples of slanted surface-relief gratings with different grating duty cycles fabricated using various techniques including techniques disclosed herein according to certain embodiments. As described above, the grating period and the line width of grating ridges of each fabricated slanted surface-relief grating can be measured from the microscopic images at, for example, the middle of grating ridges. The duty cycles of the fabricated slanted surface-relief gratings can then be calculated based on the measured grating periods and line widths, and can be compared with the designed duty cycles. For processes using slanted intermediate masks, the grating period and the line width of grating ridges of each slanted intermediate mask can also be measured from the microscopic images and used to calculate the duty cycles of the intermediate mask. In diagram 1300, the x axis corresponds to the designed duty cycle, which may be the duty cycle of the hard etch mask, such as the duty cycle of mask layer 730, hard etch mask 820, or hard etch mask 1010. The y axis corresponds to the measured duty cycle of the fabricated structure, such as a slanted surface-relief grating or an intermediate mask.

Diagram 1300 includes a curve 1310 showing the measurement results for slanted surface-relief gratings fabricated without using an intermediate mask, such as the processes illustrated in FIGS. 7A-7C and 8A-8C. As illustrated, for a hard etch mask with a duty cycle 0.1, the slanted surface-relief grating fabricated using the hard etch mask may have a duty cycle about 0.45 at least partially due to the shadowing effect of the hard etch mask (which may need to be thick in order to etch a deep slanted surface-relief grating). For a hard etch mask with a duty cycle 0.7, the slanted surface-relief grating fabricated using the hard etch mask may have a duty cycle about 0.9. Thus, the duty cycles of slanted surface-relief gratings fabricated without using an intermediate mask may range from about 0.45 to about 0.9.

Diagram 1300 also includes a curve 1320 showing the measurement results for slanted intermediate masks fabricated using thin hard etch masks as described above with respect to FIG. 10B. A curve 1330 in diagram 1300 shows the measurement results for slanted surface-relief gratings fabricated using slanted intermediate masks as described above with respect to FIG. 10C. As illustrated, for a thinner hard etch mask with a duty cycle 0.1, the slanted intermediate mask fabricated using the hard etch mask may have a duty cycle about 0.28, and the slanted surface-relief grating fabricated using slanted intermediate mask may have a duty cycle about 0.16. For a hard etch mask with a duty cycle 0.8, the slanted intermediate mask fabricated using the hard etch mask may have a duty cycle close to 1.0, and the slanted surface-relief grating fabricated using the slanted intermediate mask may have a duty cycle about 0.88. The decrease of the duty cycles of the slanted surface-relief gratings from the slanted intermediate masks may be caused by the etching of the edges of the slanted intermediate masks during the etching of the slanted surface-relief gratings. The duty cycles of the slanted surface-relief gratings fabricated using the intermediate masks may range from about 0.16 to about 0.9, which are extended significantly from the range of about 0.45 to 0.9 as shown by curve 1310.

Figure 14:
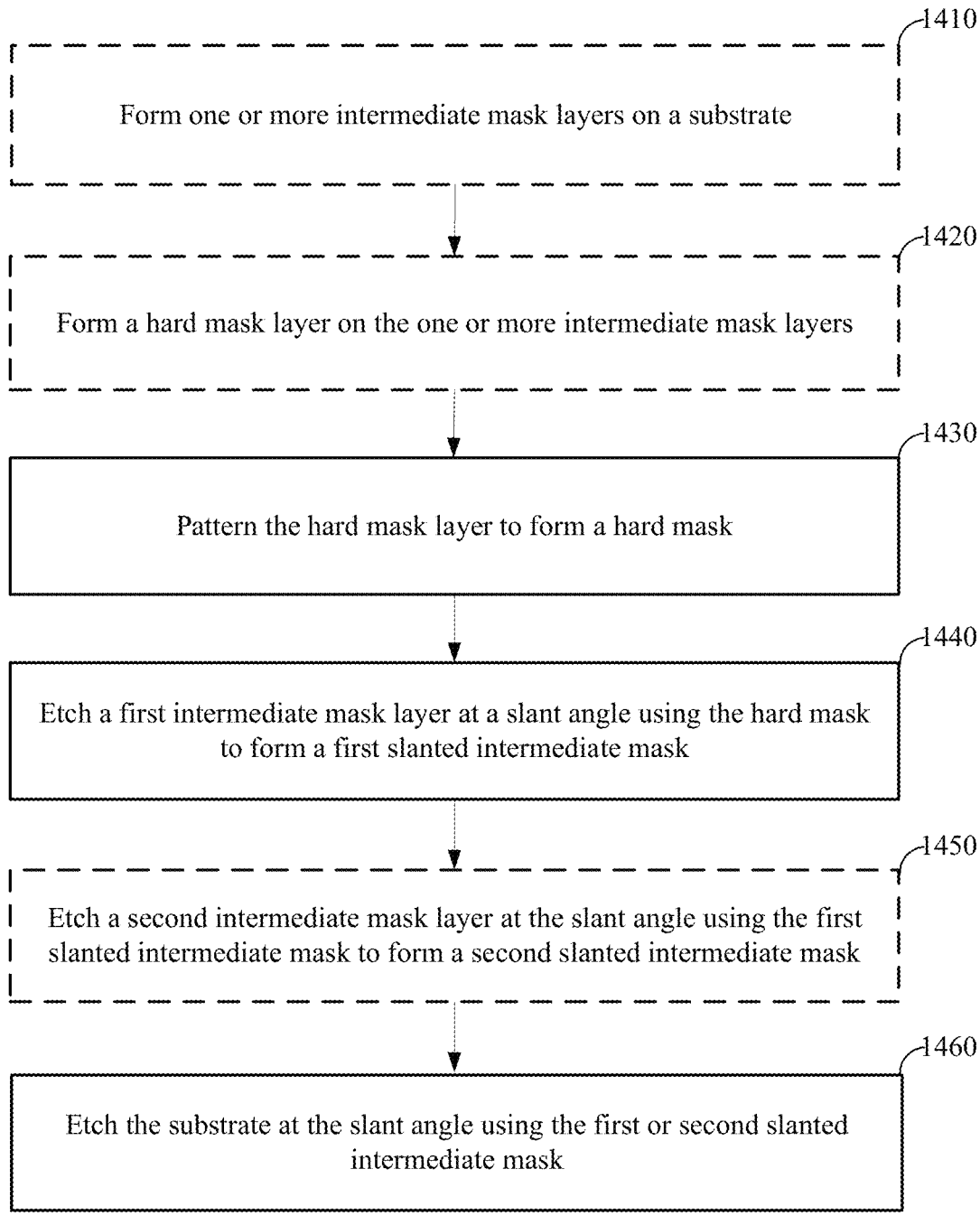
FIG. 14 is a flow chart illustrating an example of a method of fabricating a slanted surface-relief structure according to certain embodiments.

FIG. 14 is a flow chart 1400 illustrating an example of a method of fabricating a slanted surface-relief structure according to certain embodiments. The operations described in flow chart 1400 are for illustration purposes only and are not intended to be limiting. In various implementations, modifications may be made to flow chart 1400 to add additional operations, to merge some operations, to split some operations, to reorder some operations, or to omit some operations.

Optionally, at block 1410, one or more intermediate mask layers may be formed on top of a substrate. The one or more intermediate mask layers may each include an organic material, such as an optical densifying organic material, a polymer material, and the like. The thickness of each of the one or more intermediate mask layers may be greater than a desired depth of the slanted surface-relief structure to be etched in the substrate. The one or more intermediate mask layers may be formed on top of the substrate by, for example, spin coating or deposition (e.g., chemical vapor deposition (CVD)). The substrate may include, for example, a semiconductor substrate, a $SiO_2$ layer, a $Si_3N_4$ material layer, a titanium oxide layer, an alumina layer, a SiC layer, a $SiO_xN_y$ layer, an amorphous silicon layer, a spin on carbon (SOC) layer, an amorphous carbon layer (ACL), a diamond like carbon (DLC) layer, a $TiO_x$ layer, an $AlO_x$ layer, a $TaO_x$ layer, or a $HfO_x$ layer. The one or more intermediate mask layers may have an etch rate greater than an etch rate of the substrate using some etching techniques. For example, the one or more intermediate mask layers may have an etch rate greater than three times of the etch rate of the substrate.

Optionally, at block 1420, a hard mask layer may be formed on top of the one or more intermediate mask layers. The hard mask layer may include a metal (e.g., copper, chrome, titanium, aluminum, or molybdenum) or a metallic compound (e.g., MoSiON). In some embodiments, the thickness of the hard mask layer may be less than about 20 nm or less than about 10 nm. In some embodiments, the etch selectivity between the one or more intermediate mask layers and the hard mask layer may be greater than 500:1.

At block 1430, the hard mask layer may be patterned using various lithography techniques to form a hard mask. For example, the hard mask layer may be patterned using a photolithography process, where a photoresist layer may be formed on the hard mask layer and the photoresist layer may be exposed to light through a photomask. The photoresist layer may be developed to remove exposed or unexposed regions of the photoresist layer (depending on whether the photoresist is positive or negative photoresist), and may be used as the mask to etch the hard mask layer to form the hard mask. In some other embodiments, e-beam lithography or NIL process may be used to form the hard mask. In some embodiments, the hard mask may have duty cycles slightly lower than the desired duty cycles of the slanted surface-relief structure to compensate for the shadowing effect in the subsequent slanted etching.

At block 1440, a first intermediate mask layer may be etched at a slant angle in a first etching process using the hard mask to form a first slanted intermediate mask. The first etching process may be performed using, for example, an RIE system and various chemicals, such as hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, $COS$, $SF_6$, $Cl_2$, $BCl_3$, $HBr$, $H_2$, $Ar$, $He$, or $Ne$). In some embodiments, the slant angle may be greater than 30°, 45°, or 60°. The first slanted intermediate mask may have a depth greater than the desired depth of the slanted surface-relief structure to be etched in the substrate. Because the high selectivity of the etching and the high etch rate of the first intermediate mask layer, etchants (e.g., ions) having a lower energy and a thinner hard mask may be sufficient to etch the first slanted intermediate mask.

Optionally, at block 1450, a second intermediate mask layer may be etched at the slant angle in a second etching process using the first slanted intermediate mask to form a second slanted intermediate mask. The second etching process may be performed using, for example, an RIE system and various chemicals, such as hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, $COS$, $SF_6$, $Cl_2$, $BCl_3$, $HBr$, $H_2$, $Ar$, $He$, or $Ne$). The second intermediate mask layer may have a etch rate higher than the first intermediate mask layer using the second etching process. The second etching process may have different processing parameters (e.g., chemicals or ion beam energy) compared with the first etching process. In some embodiments, the duty cycles of the second slanted intermediate mask may be slightly lower than the duty cycles of the first slanted intermediate mask due to the etching of the edges of the first slanted intermediate mask during the second etching process. In some embodiments, more than two intermediate mask layers may be used to transfer the designed pattern from the hard mask to the substrate in multiple steps.

At block 1460, the substrate may be etched at the slant angle in a third etching process using the first or second slanted intermediate mask to form the slanted surface-relief structure in the substrate. The third etching process may be performed using, for example, an ME system and various chemicals, such as hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, COS, $SF_6$, $Cl_2$, $BCl_3$, HBr, $H_2$, Ar, He, or Ne).

As described above, because of the high etch selectivity between the intermediate mask layer(s) and the hard mask layer and the high etch rate of the intermediate mask layer(s), the hard mask layer can be very thin (e.g., less than about 20 or 10 nm), and thus the shadowing effect caused by the hard mask during the slanted etching can be minimized. In addition, the edges of the slant intermediate mask may be etched during subsequent etching process. Therefore, the duty cycles of the slanted surface-relief structure in the substrate may be reduced to achieve a lower minimum duty cycle, such as less than about 30%, less than about 20%, about 10%, or less. As such, the range of the duty cycles of the slanted surface-relief structure in the substrate can be from about 10% to about 90%.

As described above, etching the slanted surface-relief structures in an inorganic substrate, such as silicon dioxide, silicon nitride, titanium dioxide, alumina, ceramic, SiC, $SiO_xN_y$, amorphous silicon, spin on carbon, amorphous carbon, diamond like carbon, $TiO_x$, $AlO_x$, $TaO_x$, $HfO_x$, and the like, may be a slow process due to the relatively low etch rate. Thus, the fabrication time for etching a deep slanted surface-relief structure may be long, and/or the energy of the ions may need to be high. As such, not only a thick hard mask or intermediate mask may be needed due to the relatively low etch selectivity of the substrate material with respect to the mask, the productivity of the fabrication process may also be very low and the cost of fabricating a deep slanted surface-relief structure may be high.

According to certain embodiments, in order to increase both the range of duty cycles of the deep slanted surface-relief grating and the productivity of the fabrication process, an organic material having a higher etching rate and a higher etch selectivity with respect to the hard etch mask, such as the organic material used in the intermediate mask layer 920 described above, may be used as the grating material. The organic material may be tuned to have a refractive index greater than 1.5, such as between about 1.5 to about 1.8. As described above, the organic material may have an etch rate that is greater than 3 times of the etch rate of inorganic materials, such as quartz. Thus, the productivity of the etching process can be significantly improved. In addition, the organic material may have a high etch selectivity (e.g., greater than 500:1) with respect to the hard mask described above, such as a hard mask including a metal or a metallic compound. As such, the hard mask can be thin (such as about 10 nm) and the shadowing effect can be reduced or minimized.

Figure 15B:
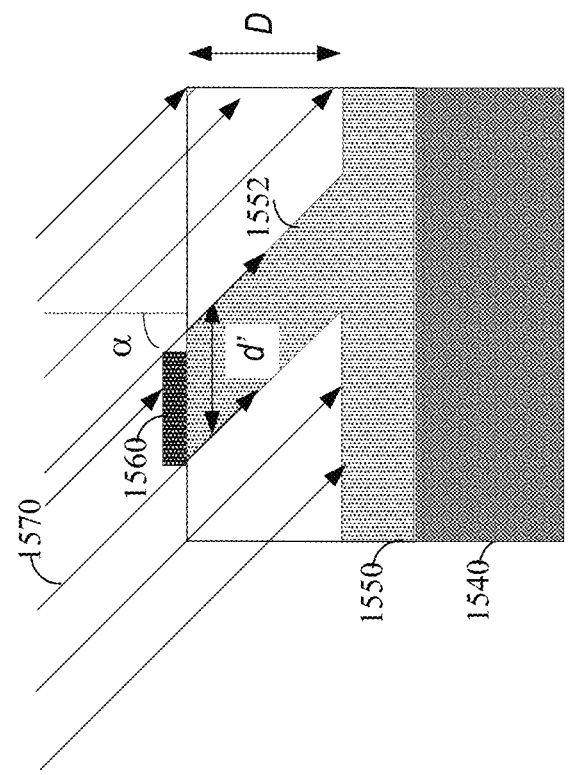
FIG. 15B illustrates an example of a thin hard mask for etching a deep slanted surface-relief grating having a small duty cycle in an organic material layer according to certain embodiments.
Figure 15A:
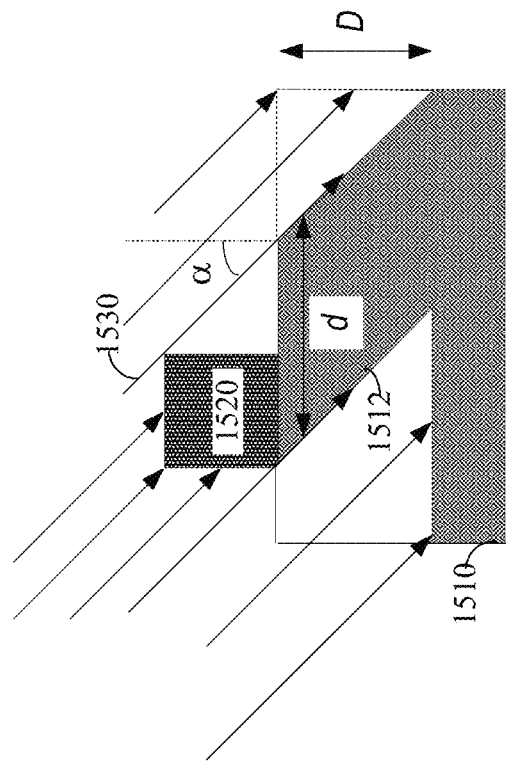
FIG. 15A illustrates an example of a thick hard mask for etching a deep slanted surface-relief grating in a substrate.

FIG. 15A illustrates an example of a thick hard mask 1520 for etching a deep slanted surface-relief grating 1512 in a substrate 1510. Substrate 1510 may include an inorganic material as described above, where the etch rate may be relatively slow. For example, in an example of a process for etching a deep slanted surface-relief grating in a quartz substrate, the etch rate may be about 12 nm/minute or lower. To etch deep slanted surface-relief grating 1512 with a depth D, a long etch time may be needed, and hard mask 1520 may need to be thick as described above and thus may have a high shadowing effect that may significantly increase the minimum line width d of the grating ridges of deep slanted surface-relief grating 1512 and reduce the achievable range of duty cycles.

FIG. 15B illustrates an example of a thin hard mask 1560 for etching a deep slanted surface-relief grating 1552 having a small duty cycle in an organic material layer 1550 according to certain embodiments. Organic material layer 1550 may be deposited on a substrate 1540, which may be any substrate described above. The deposition may be performed using a spin coating technique, a CVD technique, or other thin film coating techniques. Organic material layer 1550 may have a refractive index higher than about 1.5 and may have a depth greater than the desired depth D of etched deep slanted surface-relief grating 1552. Organic material layer 1550 may have a much higher etch rate than materials such as quartz or silicon nitride. For example, in an example of a process for etching a deep slanted surface-relief grating in an organic material layer, the etch rate may be greater than about 40 nm/minute or higher. Thus, deep slanted surface-relief grating 1552 can be etched in a much shorter time period. In addition, the organic material may have a high etch selectivity (e.g., greater than 500:1) with respect to hard mask 1560, which may include a metal (e.g., Cr) or a metallic compound. As such, hard mask 1560 can be much thinner (such as about 10 nm) compared with hard mask 1520, and thus the shadowing effect and the minimum line width d' of the grating ridges of deep slanted surface-relief grating 1552 can be significantly reduced or minimized. In this way, both a high productivity and a wide range of duty cycles can be achieved.

In some embodiments, organic material layer 1550 may be hardened before or after the etching process, such as by UV curing or thermal treatment. In some embodiments, a thin material layer with a higher mechanical strength or stiffness than the organic material layer may be substantially uniformly deposited on the surfaces of the etched deep slanted surface-relief grating using, for example, an atomic layer deposition process.

Figure 16A:
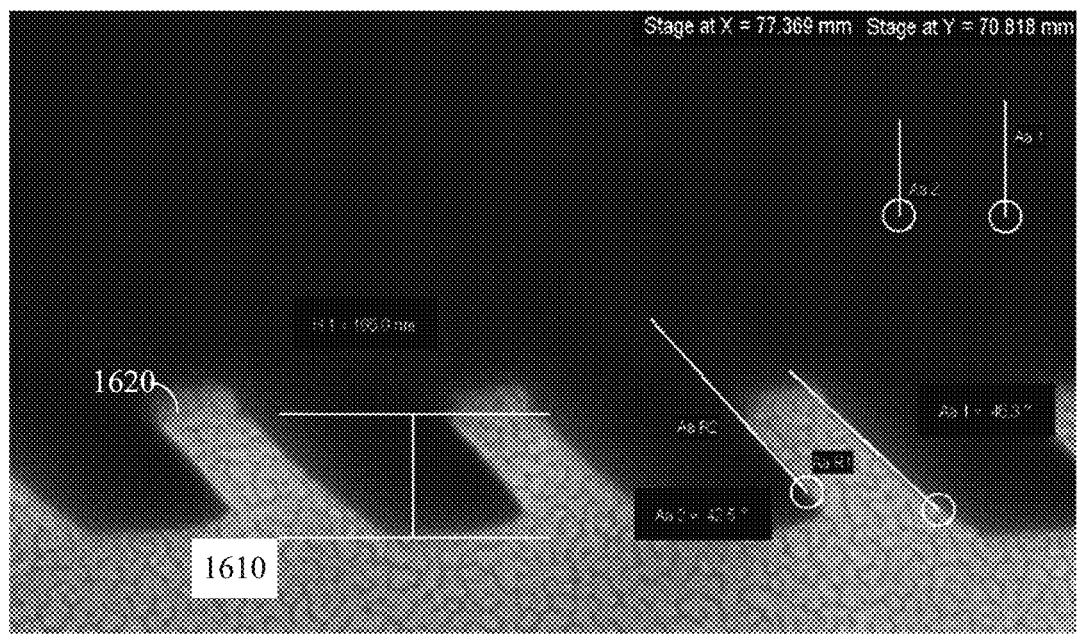
FIG. 16A is a microscopic image of an example of a slanted surface-relief grating etched in a quartz substrate.

FIG. 16A is a microscopic image 1600 of an example of a slanted surface-relief grating 1620 etched in a substrate 1610 using the process described above with respect to FIG. 15A. In the example shown in FIG. 16A, substrate 1610 may include a quartz substrate, and the etch rate of substrate 1610 using the process may be about 12 nm/minute or lower. The depth of slanted surface-relief grating 1620 is measured to be about 165 nm.

Figure 16B:
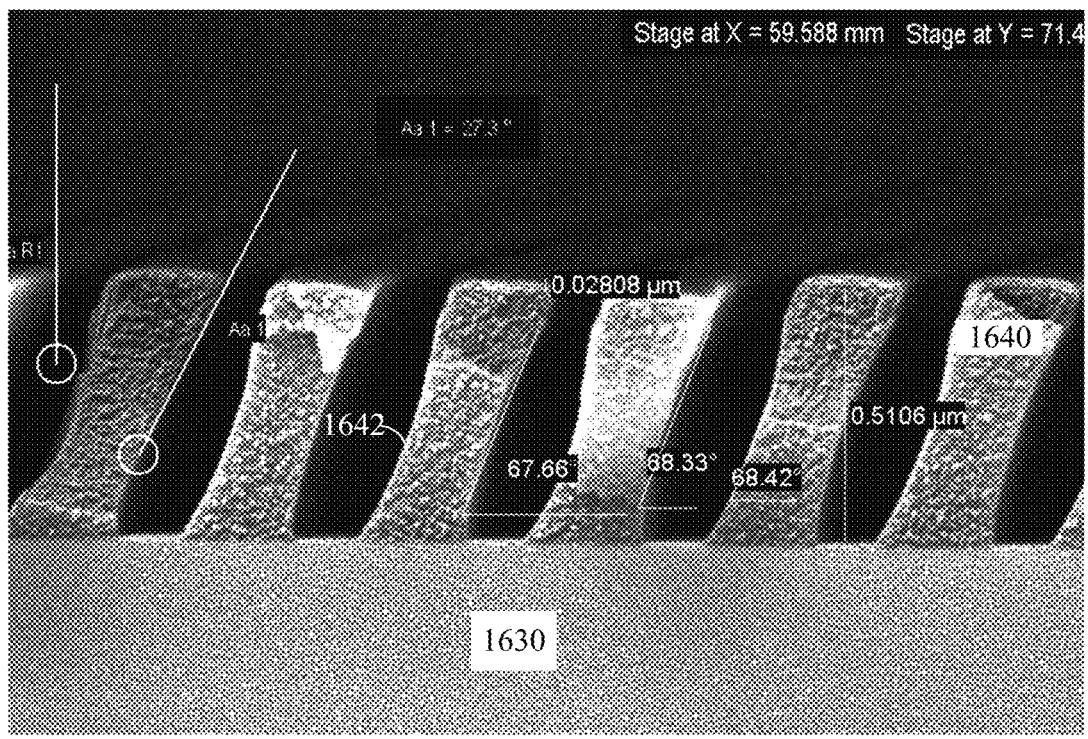
FIG. 16B is a microscopic image of an example of a slanted surface-relief grating etched in an organic material layer according to certain embodiments.

FIG. 16B is a microscopic image 1605 of an example of a slanted surface-relief grating 1642 etched in an organic material layer 1640 according to certain embodiments. Organic material layer 1640 may be formed on a substrate 1630, such as a quartz substrate. Slanted surface-relief grating 1642 may be etched in organic material layer 1640 using the process described above with respect to FIG. 15B. In the example shown in FIG. 16B, the etch rate of organic material layer 1640 using the process may be about 40 nm/minute or higher. The depth of slanted surface-relief grating 1642 is measured to be about 510 nm.

Figure 17:
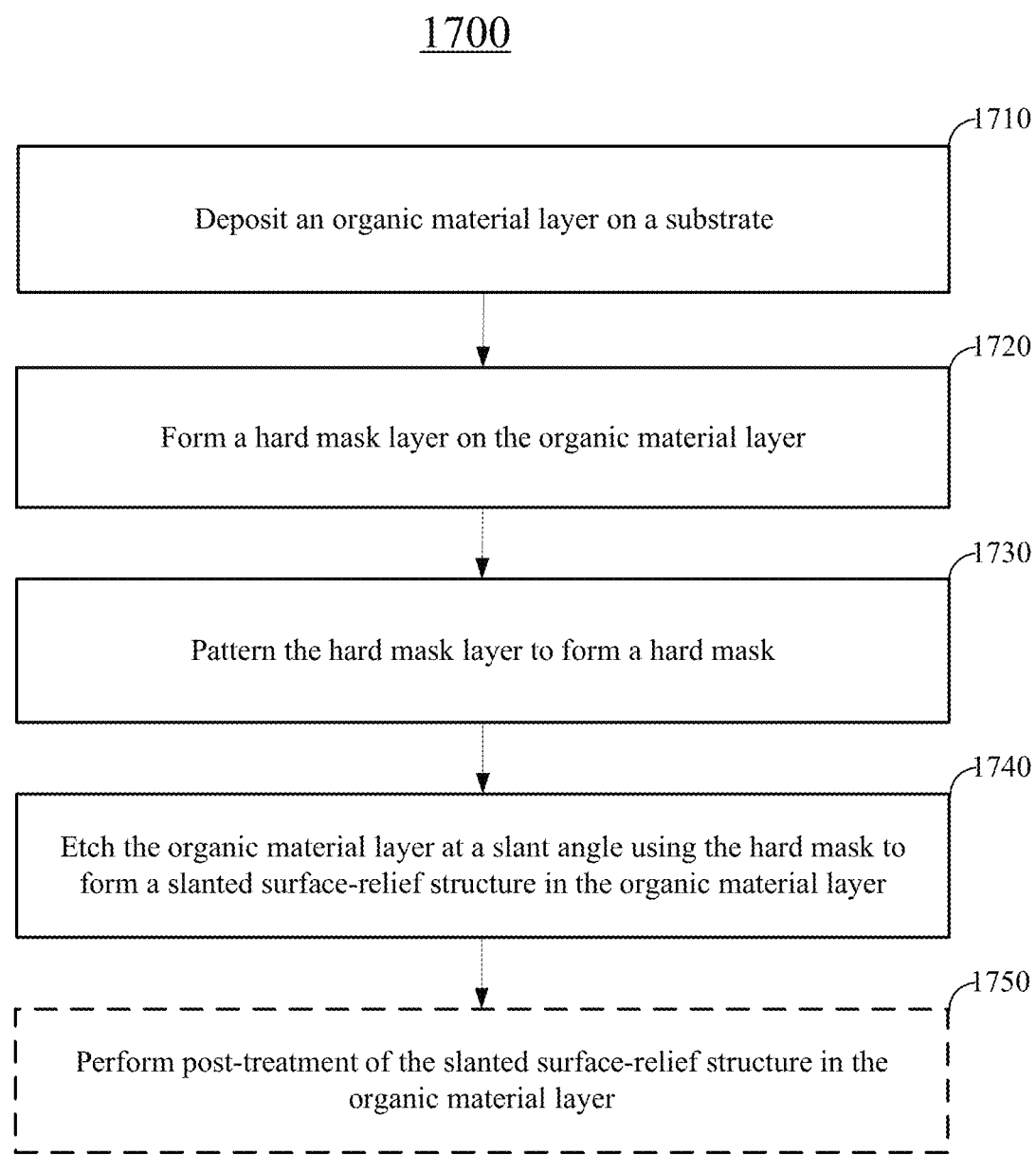
FIG. 17 is a simplified flow chart illustrating an example method of fabricating a deep slanted surface-relief structure according to certain embodiments.

FIG. 17 is a simplified flow chart 1700 illustrating an example method of fabricating a deep slanted surface-relief structure according to certain embodiments. The operations described in flow chart 1700 are for illustration purposes only and are not intended to be limiting. In various implementations, modifications may be made to flow chart 1700 to add additional operations, to merge some operations, to split some operations, to reorder some operations, or to omit some operations. The operations described in flow chart 1700 may be performed using, for example, a reactive ion etching (RIE) system.

At block 1710, an organic material layer may be formed on a substrate. In some embodiments, the organic material layer may include, for example, a polymer doped with high refractive index nanoparticles (e.g., $TiO_2$, GaP, $HfO_2$, GaAs, etc.). In some embodiments, the refractive index of the organic material layer may be greater than 1.5, 1.6, 1.7, 1.8, or higher. The organic material layer may be formed on the substrate by, for example, a spin coating process. The thickness of the organic material layer may be greater than a few hundred nanometers or a few micrometers. The etch rate of the organic material layer can be much higher than the etch rate of an inorganic substrate material, such as quartz or silicon nitride.

At block 1720, a hard mask layer may be formed on the organic material layer. The hard mask layer may include a metal (e.g., copper, chrome, titanium, aluminum, or molybdenum) or a metallic compound (e.g., MoSiON). In some embodiments, the thickness of the hard mask layer may be less than about 20 nm or less than about 10 nm. In some embodiments, the etch selectivity between the organic material layer and the hard mask layer may be greater than 500:1.

At block 1730, the hard mask layer may be patterned using various lithography techniques to form a hard mask. As described above, the hard mask layer may be patterned using a photolithography process, where a photoresist layer may be formed on the hard mask layer and the photoresist layer may be exposed to light through a photomask. The photoresist layer may be developed to remove exposed or unexposed regions of the photoresist layer (depending on whether the photoresist is positive or negative photoresist), and may be used as the mask to etch the hard mask layer to form the hard mask. In some other embodiments, e-beam lithography or NIL process may be used to form the hard mask. In some embodiments, the hard mask may have duty cycles slightly lower than the desired duty cycles of the slanted surface-relief structure to compensate for the shadowing effect caused by subsequent slanted etching.

At block 1740, the organic material layer may be etched at a slant angle in an etching process using the hard mask to form a slanted surface-relief structure in the organic material layer. The etching process may be performed using, for example, an RIE system and various chemicals, such as hydrogen ions, helium ions, oxygen ions, and reactive gases (e.g., at least one of $CF_4$, $CHF_3$, $CH_2F_2$, $CH_3F$, $C_4F_8$, $C_4F_6$, $C_2F_6$, $C_2F_8$, $NF_3$, $CLF_3$, $N_2O$, $N_2$, $O_2$, $SO_2$, COS, $SF_6$, $Cl_2$, $BCl_3$, HBr, $H_2$, Ar, He, or Ne). In some embodiments, the slant angle may be greater than 30°, 45°, or 60°. Because the high selectivity of the etching and the high etch rate of the organic material layer, etchants (e.g., ions) having a lower energy and a thinner hard mask may be sufficient to etch the slanted surface-relief structure in the organic material layer. As such, the shadowing effect caused by the hard mask during the slanted etching can be minimized. In addition, due to the high etching rate of the organic material layer, a higher productivity may be achieved.

Optionally, at block 1750, a post-treatment process may be applied to the slanted surface-relief structure in the organic material layer. For example, in some embodiments, the organic material layer may be hardened after the etching process, such as by UV curing or thermal treatment. In some embodiments, a thin material layer with a higher mechanical strength or stiffness than the organic material layer may be substantially uniformly deposited on the surfaces of the etched slanted surface-relief grating using, for example, an atomic layer deposition process.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 18:
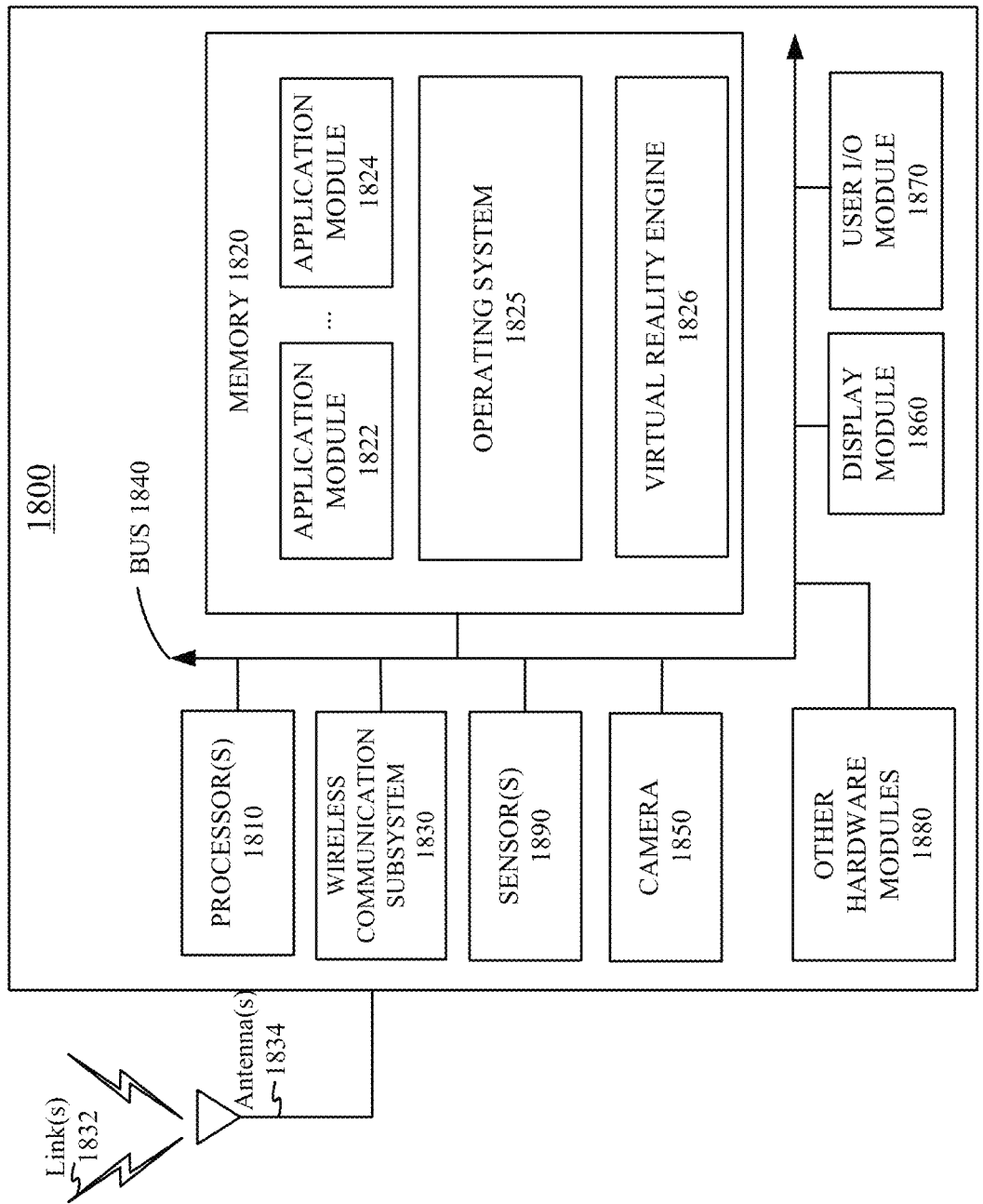
FIG. 18 is a simplified block diagram of an example electronic system of an example near-eye display for implementing some of the examples disclosed herein.

FIG. 18 is a simplified block diagram of an example electronic system 1800 of an example near-eye display (e.g., HMD device) for implementing some of the examples disclosed herein. Electronic system 1800 may be used as the electronic system of an HMD device or other near-eye displays described above. In this example, electronic system 1800 may include one or more processor(s) 1810 and a memory 1820. Processor(s) 1810 may be configured to execute instructions for performing operations at a number of components, and can be, for example, a general-purpose processor or microprocessor suitable for implementation within a portable electronic device. Processor(s) 1810 may be communicatively coupled with a plurality of components within electronic system 1800. To realize this communicative coupling, processor(s) 1810 may communicate with the other illustrated components across a bus 1840. Bus 1840 may be any subsystem adapted to transfer data within electronic system 1800. Bus 1840 may include a plurality of computer buses and additional circuitry to transfer data.

Memory 1820 may be coupled to processor(s) 1810. In some embodiments, memory 1820 may offer both short-term and long-term storage and may be divided into several units. Memory 1820 may be volatile, such as static random access memory (SRAM) and/or dynamic random access memory (DRAM) and/or non-volatile, such as read-only memory (ROM), flash memory, and the like. Furthermore, memory 1820 may include removable storage devices, such as secure digital (SD) cards. Memory 1820 may provide storage of computer-readable instructions, data structures, program modules, and other data for electronic system 1800. In some embodiments, memory 1820 may be distributed into different hardware modules. A set of instructions and/or code might be stored on memory 1820. The instructions might take the form of executable code that may be executable by electronic system 1800, and/or might take the form of source and/or installable code, which, upon compilation and/or installation on electronic system 1800 (e.g., using any of a variety of generally available compilers, installation programs, compression/decompression utilities, etc.), may take the form of executable code.

In some embodiments, memory 1820 may store a plurality of application modules 1822 through 1824, which may include any number of applications. Examples of applications may include gaming applications, conferencing applications, video playback applications, or other suitable applications. The applications may include a depth sensing function or eye tracking function. Application modules 1822-1824 may include particular instructions to be executed by processor(s) 1810. In some embodiments, certain applications or parts of application modules 1822-1824 may be executable by other hardware modules 1880. In certain embodiments, memory 1820 may additionally include secure memory, which may include additional security controls to prevent copying or other unauthorized access to secure information.

In some embodiments, memory 1820 may include an operating system 1825 loaded therein. Operating system 1825 may be operable to initiate the execution of the instructions provided by application modules 1822-1824 and/or manage other hardware modules 1880 as well as interfaces with a wireless communication subsystem 1830 which may include one or more wireless transceivers. Operating system 1825 may be adapted to perform other operations across the components of electronic system 1800 including threading, resource management, data storage control and other similar functionality.

Wireless communication subsystem 1830 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1800 may include one or more antennas 1834 for wireless communication as part of wireless communication subsystem 1830 or as a separate component coupled to any portion of the system. Depending on desired functionality, wireless communication subsystem 1830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1830 may permit data to be exchanged with a network, other computer systems, and/or any other devices described herein. Wireless communication subsystem 1830 may include a means for transmitting or receiving data, such as identifiers of HMD devices, position data, a geographic map, a heat map, photos, or videos, using antenna(s) 1834 and wireless link(s) 1832. Wireless communication subsystem 1830, processor(s) 1810, and memory 1820 may together comprise at least a part of one or more of a means for performing some functions disclosed herein.

Embodiments of electronic system 1800 may also include one or more sensors 1890. Sensor(s) 1890 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1890 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1800 may include a display module 1860. Display module 1860 may be a near-eye display, and may graphically present information, such as images, videos, and various instructions, from electronic system 1800 to a user. Such information may be derived from one or more application modules 1822-1824, virtual reality engine 1826, one or more other hardware modules 1880, a combination thereof, or any other suitable means for resolving graphical content for the user (e.g., by operating system 1825). Display module 1860 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1800 may include a user input/output module 1870. User input/output module 1870 may allow a user to send action requests to electronic system 1800. An action request may be a request to perform a particular action. For example, an action request may be to start or end an application or to perform a particular action within the application. User input/output module 1870 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1800. In some embodiments, user input/output module 1870 may provide haptic feedback to the user in accordance with instructions received from electronic system 1800. For example, the haptic feedback may be provided when an action request is received or has been performed.

Electronic system 1800 may include a camera 1850 that may be used to take photos or videos of a user, for example, for tracking the user's eye position. Camera 1850 may also be used to take photos or videos of the environment, for example, for VR, AR, or MR applications.

Camera 1850 may include, for example, a complementary metal-oxide-semiconductor (CMOS) image sensor with a few millions or tens of millions of pixels. In some implementations, camera 1850 may include two or more cameras that may be used to capture 3-D images.

In some embodiments, electronic system 1800 may include a plurality of other hardware modules 1880. Each of other hardware modules 1880 may be a physical module within electronic system 1800. While each of other hardware modules 1880 may be permanently configured as a structure, some of other hardware modules 1880 may be temporarily configured to perform specific functions or temporarily activated. Examples of other hardware modules 1880 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1880 may be implemented in software.

In some embodiments, memory 1820 of electronic system 1800 may also store a virtual reality engine 1826. Virtual reality engine 1826 may execute applications within electronic system 1800 and receive position information, acceleration information, velocity information, predicted future positions, or some combination thereof of the HMD device from the various sensors. In some embodiments, the information received by virtual reality engine 1826 may be used for producing a signal (e.g., display instructions) to display module 1860. For example, if the received information indicates that the user has looked to the left, virtual reality engine 1826 may generate content for the HMD device that mirrors the user's movement in a virtual environment. Additionally, virtual reality engine 1826 may perform an action within an application in response to an action request received from user input/output module 1870 and provide feedback to the user. The provided feedback may be visual, audible, or haptic feedback. In some implementations, processor(s) 1810 may include one or more GPUs that may execute virtual reality engine 1826.

In various implementations, the above-described hardware and modules may be implemented on a single device or on multiple devices that can communicate with one another using wired or wireless connections. For example, in some implementations, some components or modules, such as GPUs, virtual reality engine 1826, and applications (e.g., tracking application), may be implemented on a console separate from the head-mounted display device.

In some implementations, one console may be connected to or support more than one HMD.

In alternative configurations, different and/or additional components may be included in electronic system 1800. Similarly, functionality of one or more of the components can be distributed among the components in a manner different from the manner described above. For example, in some embodiments, electronic system 1800 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used.

Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A slanted surface-relief structure for a waveguide display in a near-eye display system, the slanted surface-relief structure comprising:
    an inorganic substrate configured to guide visible light of display images; and
    an inorganic slanted surface-relief optical grating formed in the inorganic substrate and configured to diffractively couple the visible light guided by the inorganic substrate out of the inorganic substrate at a plurality of areas of the inorganic substrate, wherein a grating period of the slanted surface-relief optical grating varies from one area to another area in the plurality of areas of the inorganic substrate such that the visible light guided by the inorganic substrate is coupled out of the inorganic substrate at different areas of the inorganic substrate in different respective directions towards an eye of a user of the near-eye display system,
    wherein a minimum duty cycle of the inorganic slanted surface-relief optical grating is less than 30%;
    wherein a slant angle of the inorganic slanted surface-relief optical grating is greater than 45° with respect to a surface normal of the inorganic substrate; and
    wherein a depth of the inorganic slanted surface-relief optical grating is greater than 100 nm.

2. The slanted surface-relief structure of claim 1, wherein the inorganic slanted surface-relief optical grating is characterized by a duty cycle varying across areas of the inorganic slanted surface-relief optical grating.

3. The slanted surface-relief structure of claim 2, wherein the duty cycle varying across areas of the inorganic slanted surface-relief optical grating is characterized by the minimum duty cycle less than 30% and a maximum duty cycle greater than 75%.

4. The slanted surface-relief structure of claim 1, wherein the inorganic slanted surface-relief optical grating includes a dry-etched grating.

5. The slanted surface-relief structure of claim 1, wherein the minimum duty cycle of the inorganic slanted surface-relief optical grating is less than 20%.

6. The slanted surface-relief structure of claim 1, wherein the depth of the inorganic slanted surface-relief optical grating is greater than 200 nm.

7. The slanted surface-relief structure of claim 1, wherein the inorganic substrate comprises a semiconductor substrate, a $SiO_2$ layer, a $Si_3N_4$ material layer, a SiC layer, a $SiO_xN_y$ layer, an amorphous silicon layer, a spin on carbon (SOC) layer, an amorphous carbon layer (ACL), a diamond like carbon (DLC) layer, a $TiO_x$ layer, an $AlO_x$ layer, a $TaO_x$ layer, or a $HfO_x$ layer.

8. The slanted surface-relief structure of claim 1, further comprising an over-coat layer on the inorganic slanted surface-relief optical grating, the over-coat layer characterized by a first refractive index different from a second refractive index of the inorganic substrate.

9. The slanted surface-relief structure of claim 8, wherein the over-coat layer includes Hafnia, Titania, Tantalum oxide, Tungsten oxide, Zirconium oxide, Gallium sulfide, Gallium nitride, Gallium phosphide, silicon, silicon oxide, alumina, porous silica, or a polymer.

10. The slanted surface-relief structure of claim 8, wherein a difference between the first refractive index and the second refractive index is greater than 0.1.

* * * * *